(12) United States Patent
Abi-Akl et al.

(10) Patent No.: US 12,106,049 B1
(45) Date of Patent: Oct. 1, 2024

(54) ONTOLOGY MAPPING AND ADAPTATION SYSTEMS AND METHODS

(71) Applicant: YSEOP SA, Lyons (FR)

(72) Inventors: Hanna Abi-Akl, Paris (FR); Hugues Sézille de Mazancourt, Thiais (FR); Dominique Mariko, Paris (FR)

(73) Assignee: YSEOP SA, Lyons (FR)

( * ) Notice: Subject to any disclaimer, the term of this patent is extended or adjusted under 35 U.S.C. 154(b) by 315 days.

(21) Appl. No.: 17/695,920

(22) Filed: Mar. 16, 2022

(51) Int. Cl.
*G06F 40/237* (2020.01)
*G06F 40/279* (2020.01)

(52) U.S. Cl.
CPC .......... *G06F 40/237* (2020.01); *G06F 40/279* (2020.01)

(58) Field of Classification Search
CPC ....... G06F 40/237; G06F 40/279; G10L 15/22
See application file for complete search history.

(56) References Cited

U.S. PATENT DOCUMENTS

| | | | |
|---|---|---|---|
| 11,095,579 B1 | 8/2021 | Mazancourt et al. | |
| 11,210,473 B1 | 12/2021 | Mariko et al. | |
| 11,449,687 B2 | 9/2022 | Salmon et al. | |
| 11,501,088 B1 | 11/2022 | Mariko et al. | |
| 2016/0048655 A1* | 2/2016 | Maitra | G16H 70/40 705/3 |
| 2016/0140453 A1* | 5/2016 | Adderly | G06N 5/022 706/11 |
| 2016/0162456 A1* | 6/2016 | Munro | G06F 16/24532 704/9 |
| 2018/0276293 A1* | 9/2018 | Rozsa | G06F 40/30 |
| 2020/0387551 A1* | 12/2020 | Hays | G06F 16/36 |
| 2021/0342380 A1* | 11/2021 | Luus | G06N 3/042 |
| 2023/0124889 A1* | 4/2023 | Robert Jose | H04M 3/527 704/9 |

OTHER PUBLICATIONS

Akl et al., Yseop at FinSim-3 Shared Task 2021: Specializing Financial Domain Learning with Phrase Representations. Proceedings of the Third Workshop on Financial Technology and Natural Language Processing. Aug. 19, 2021. pp. 52-57.
Devlin et al., BERT: Pre-training of deep bidirectional transformers for language understanding. arXiv preprint arXiv:1810.04805v1. Oct. 11, 2018. 14 pages.

* cited by examiner

*Primary Examiner* — Abul K Azad
(74) *Attorney, Agent, or Firm* — Wolf, Greenfield & Sacks, P.C.

(57) ABSTRACT

Techniques for generating natural language text. The techniques including: receiving information indicating a target vocabulary for use in generating natural language text, the target vocabulary comprising multiple terms representing respective multiple variables; accessing an ontology of entities used for generating natural language text, wherein each of at least some of the entities in the ontology of entities is associated with one or more respective linguistic attributes; mapping at least some of the multiple terms to entities in the ontology, modifying the ontology, based on the mapping, to obtain a modified ontology; receiving data indicating values for at least some of the multiple variables; and generating natural language text using the data and information in the modified ontology associated with the at least some of the multiple variables.

18 Claims, 33 Drawing Sheets

| Index | Word |
|---|---|
| 1 | Indicator |
| 2 | Units Sold (number) |
| 3 | Manufacturing Price |
| 4 | Sale Price |
| 5 | Gross Sales |
| 6 | Discounts |
| 7 | Net Sales |
| 8 | COGS |
| 9 | Profit |
| 10 | Sales |

FIG. 3B

| Index | Word |
|---|---|
| 1 | Target Vocabulary Word 1 |
| 2 | Target Vocabulary Word 2 |
| 3 | Target Vocabulary Word 3 |
| 4 | Target Vocabulary Word 4 |
| 5 | Target Vocabulary Word 5 |
| ... | |
| n | Target Vocabulary Word n |

FIG. 3A

| Document Indicator | Ontology Indicator | Ontology Id | | Ontology Class | | Ontology Number | Ontology Gender |
|---|---|---|---|---|---|---|---|
| units sold (number) | units sold (number) | CUSTOM | UNITS_SOLD_NUMBER ⌄ | OTHERS ⌄ | | singular ⌄ | n/a ⌄ |
| manufacturing price | manufacturing price | CUSTOM | MANUFACTURING_PRICE ⌄ | OTHERS ⌄ | | singular ⌄ | n/a ⌄ |
| sale price | sale price | CUSTOM | SALE_PRICE ⌄ | OTHERS ⌄ | | singular ⌄ | n/a ⌄ |
| gross sales | gross sales | CUSTOM | GROSS_SALES ⌄ | OTHERS ⌄ | | singular ⌄ | n/a ⌄ |
| discounts | discounts | CUSTOM | DISCOUNTS ⌄ | OTHERS ⌄ | | singular ⌄ | n/a ⌄ |
| net sales | net sales | CUSTOM | NET_SALES ⌄ | OTHERS ⌄ | | singular ⌄ | n/a ⌄ |
| cogs | cogs | CUSTOM | COGS ⌄ | OTHERS ⌄ | | singular ⌄ | n/a ⌄ |
| profit | net profit | NET_EARNINGS ⌄ | | EARNINGS | | singular | N/A |
| sales | sales | SALES ⌄ | | EARNINGS | | plural | N/A |

Legend: ☒ Indicator Match > 90%  ☐ Indicator Match > 75%  ☐ Indicator Match < 75%  ☐ Duplicate Indicator 811 — Ontology Id field; 812 — dropdown
810, 820, 830, 840, 850, 860, 870, 880, 890 — row indicators

[Export Mapping]   [VALET Home]

FIG. 8A

| Document Indicator | Ontology Indicator | Ontology Id | Ontology Class | Ontology Number | Ontology Gender |
|---|---|---|---|---|---|
| units sold (number) | units sold (number) | CUSTOM / UNITS_SOLD_NUMBER / SALES / COST_OF_SALES / INVENTORIES / PRODUCTION_GOODS_IN_PROGRESS / CUSTOM / IGNORE / EXISTING | OTHERS | singular | n/a |
| manufacturing price | manufacturing price | CUSTOM | OTHERS | singular | n/a |
| sale price | sale price | CUSTOM / SALE_PRICE | OTHERS | singular | n/a |
| gross sales | gross sales | CUSTOM / GROSS_SALES | OTHERS | singular | n/a |
| discounts | discounts | CUSTOM / DISCOUNTS | OTHERS | singular | n/a |
| net sales | net sales | CUSTOM / NET_SALES | OTHERS | singular | n/a |
| cogs | cogs | CUSTOM / COGS | OTHERS | singular | n/a |
| profit | net profit | NET_EARNINGS | EARNINGS | singular | N/A |
| sales | sales | SALES | EARNINGS | plural | N/A |

☒ Indicator Match > 90%   ☐ Indicator Match < 75%
☐ Indicator Match > 75%   ☐ Duplicate Indicator Export Mapping          VALET Home

FIG. 8B

| Document Indicator | Ontology Indicator | Ontology Id | Ontology Class | Ontology Number | Ontology Gender |
|---|---|---|---|---|---|
| units sold (number) | units sold (number) | UNITS_SOLD_NUMBER | OTHERS | singular | n/a |
| manufacturing price | manufacturing price | MANUFACTURING_PRICE | OTHERS | singular | n/a |
| sale price | sale price | SALE_PRICE | OTHERS | singular | n/a |
| gross sales | gross sales | CUSTOM GROSS_SALES | OTHERS | singular | n/a |
| discounts | discounts | DISCOUNTS | OTHERS | singular | n/a |
| net sales | net sales | CUSTOM NET_SALES | OTHERS | singular | n/a |
| cogs | cogs | CUSTOM | OTHERS | singular | n/a |
| profit | net profit | | EARNINGS | singular | N/A |
| sales | sales | | EARNINGS | plural | N/A |

Dropdown (871) options under CUSTOM: COGS, INVENTORIES, GEARING RATIO, CASH_AND_CASH_EQUIVALENTS, TECHNICAL_EQUIPMENT_TOOLS, CUSTOM, IGNORE, EXISTING Legend: ☒ Indicator Match > 90%  ☐ Indicator Match > 75%  ☐ Indicator Match > 75%  ☐ Duplicate Indicator 810, 820, 830, 840, 850, 860, 870, 880, 890

Export Mapping    VALET Home

FIG. 8C

| Document Indicator | Ontology Indicator | Ontology Id | Ontology Class | Ontology Number | Ontology Gender |
|---|---|---|---|---|---|
| units sold (number) | units sold (number) | UNITS_SOLD_NUMBER ⌄ | OTHERS | singular | n/a |
| manufacturing price | manufacturing price | MANUFACTURING_PRICE ⌄ | OTHERS | singular | n/a |
| sale price | sale price | SALE_PRICE ⌄ | OTHERS | singular | n/a |
| gross sales | gross sales | CUSTOM / GROSS_SALES ⌄ | OTHERS ⌄ | singular ⌄ | n/a ⌄ |
| discounts | discounts | DISCOUNTS ⌄ | OTHERS | singular | n/a |
| net sales | net sales | CUSTOM / NET_SALES ⌄ | OTHERS ⌄ | singular ⌄ | n/a ⌄ |
| cogs | cogs | Existing / ACCOUNTS_RECEIVABLE_DAYS ⌄ | NA | NA | N/A |
| profit | net profit | | EARNINGS | singular | N/A |
| sales | sales | | EARNINGS* | plural | N/A |
| Export Mapping | | | | | |

Legend:
- ▨ Indicator Match > 90%
- ☐ Indicator Match > 75%
- ▧ Indicator Match > 75%
- ☐ Duplicate Indicator Dropdown (872) options: CHANGE_IN_PAYABLES, CHANGE_IN_WORKING_CAPITAL_REQUIREMENT, CHANGE_IN_WORKING_CAPITAL_REQUIREMENT_OTHER, COMMERCIAL_EXPENSES, COMMISSIONS, COMPENSATIONS_FOR_ACQUISITION, COST_OF_SALES, CURRENT_ASSETS, CURRENT_DEBT_FROM_GROUP_FINANCE, CURRENT_DEBT_FROM_LONG_TERM_RECEIVABLES, CURRENT_DEBT_FROM_LONG_TERM_FINANCIAL_RECEIVABLES, CURRENT_FINANCIAL_ASSETS, CURRENT_FINANCIAL_LIABILITIES, CURRENT_PORTION_OF_LONG_TERM_DEBT, CURRENT_PORTION_OF_LONG_TERM_FINANCIAL_RECEIVABLES, CURRENT_PROVISIONS, CURRENT_TAX_LIABILITIES, DEBT_CAPITAL_ASSETS_RELATED_PAYABLES

FIG. 8D

| Document Indicator | Ontology Indicator | Ontology Id | Ontology Class | Ontology Number | Ontology Gender |
|---|---|---|---|---|---|
| units sold (number) | units sold (number) | UNITS_SOLD_NUMBER ▾ | OTHERS ▾ | singular | n/a |
| manufacturing price | manufacturing price | MANUFACTURING_PRICE ▾ | OTHERS ▾ | singular | n/a |
| sale price | sale price | SALE_PRICE ▾ | OTHERS ▾ | singular | n/a |
| gross sales | gross sales | CUSTOM / GROSS_SALES ▾ | OTHERS ▾ | singular ▾ | n/a ▾ |
| discounts | discounts | DISCOUNTS ▾ | OTHERS ▾ | singular | n/a |
| net sales | net sales | CUSTOM / NET_SALES ▾ | OTHERS ▾ | singular ▾ | n/a ▾ |
| cogs | N/A | EXISTING / COST_OF_SALES ▾ | | N/A | N/A |
| profit | net profit | NET_EARNINGS ▾ | | singular | N/A |
| sales | sales | SALES ▾ | | plural | N/A |

841: -- Map appropriate Class --
OTHERS
OTHERS
EXPENSES
CHARGES
DEBTS
PURCHASES
PAYMENTS
RECEIVABLES
ASSETS
PROVISION
EARNINGS
EARNINGS
CASH
INCOME
RESULTS
RECEIVED ☒ Indicator Match > 90%   ☐ Indicator Match > 75%
☐ Indicator Match > 75%   ☐ Duplicate Indicator 800, 810, 820, 830, 840, 850, 860, 870, 880, 890

Export Mapping     VALET Home

FIG. 8E

| Document Indicator | Ontology Indicator | Ontology Id | Ontology Class | Ontology Number | Ontology Gender |
|---|---|---|---|---|---|
| units sold (number) | units sold (number) | UNITS_SOLD_NUMBER | OTHERS | singular | n/a |
| manufacturing price | manufacturing price | MANUFACTURING_PRICE | OTHERS | singular | n/a |
| sale price | sale price | SALE_PRICE | OTHERS | singular | n/a |
| gross sales | gross sales | CUSTOM / GROSS_SALES | RESULTS | singular | n/a |
| discounts | discounts | DISCOUNTS | OTHERS | singular | n/a |
| net sales | net sales | CUSTOM / NET_SALES | OTHERS | singular | n/a |
| cogs | N/A | EXISTING / COST_OF_SALES | N/A | N/A | N/A |
| profit | net profit | GROSS_PROFIT | RESULTS | singular | N/A |
| sales | sales | | EARNINGS | plural | N/A |

882: NET_EARNINGS / GROSS_PROFIT / OPERATING_PROFIT / NET_EARNINGS / PROFIT_MARGIN_RATIO / CUSTOM / IGNORE / EXISTING

☒ Indicator Match > 90%  ☐ Indicator Match > 75%
☒ Indicator Match > 75%  ☐ Duplicate Indicator 810 820 830 840 850 860 870 880 890

Export Mapping   VALET Home

FIG. 8F

| Document Indicator | Ontology Indicator | Ontology Id | Ontology Class | Ontology Number | Ontology Gender |
|---|---|---|---|---|---|
| units sold (number) | units sold (number) | UNITS_SOLD_NUMBER ▼ | OTHERS | singular | n/a |
| manufacturing price | manufacturing price | MANUFACTURING_PRICE ▼ | OTHERS | singular | n/a |
| sale price | sale price | SALE_PRICE ▼ | OTHERS | singular | n/a |
| gross sales | gross sales | CUSTOM / GROSS_SALES ▼ | RESULTS ▼ | singular ▼ | n/a ▼ |
| discounts | discounts | DISCOUNTS ▼ | OTHERS | singular | n/a |
| net sales | net sales | EXISTING / SALES ▼ | N/A ▼ | N/A | N/A |
| cogs | N/A | Existing / COST_OF_SALES ▼ | N/A | N/A | N/A |
| profit | net profit | GROSS_PROFIT ▼ | RESULTS | singular | N/A |
| sales | sales | SALES ▼ | EARNINGS | plural | N/A |

☒ Indicator Match > 90%   ☐ Indicator Match > 75%
☒ Indicator Match > 75%   ☐ Duplicate Indicator Export Mapping       VALET Home

FIG. 8G

| Document Indicator | Ontology Indicator | Ontology Id | Ontology Class | Ontology Number | Ontology Gender |
|---|---|---|---|---|---|
| units sold (number) | units sold (number) | UNITS_SOLD_NUMBER | OTHERS | singular | n/a |
| manufacturing price | manufacturing price | MANUFACTURING_PRICE | OTHERS | singular | n/a |
| sale price | sale price | SALE_PRICE | OTHERS | singular | n/a |
| gross sales | gross sales | CUSTOM / GROSS_SALES | RESULTS | singular | n/a |
| discounts | discounts | DISCOUNTS | OTHERS | singular | n/a |
| net sales | N/A | EXISTING | N/A | N/A | N/A |
| cogs | N/A | Existing / COST_OF_SALES | N/A | N/A | N/A |
| profit | net profit | GROSS_PROFIT | RESULTS | singular | N/A |
| sales | sales | SALES | EARNINGS | plural | N/A |

☒ Indicator Match > 90%  ☐ Indicator Match > 75%
☐ Indicator Match > 75%  ☐ Duplicate Indicator Dropdown 892: SALES / COST_OF_SALES / SALES_EXPORT / GROSS_PROFIT / NET_EARNINGS / CUSTOM / IGNORE / EXISTING Export Mapping    VALET Home

FIG. 8H

| Document Indicator | Ontology Indicator | Ontology Id | Ontology Class | Ontology Number | Ontology Gender |
|---|---|---|---|---|---|
| units sold (number) | units sold (number) | UNITS_SOLD_NUMBER ∨ | OTHERS | singular | n/a |
| manufacturing price | manufacturing price | MANUFACTURING_PRICE ∨ | OTHERS | singular | n/a |
| sale price | sale price | SALE_PRICE ∨ | OTHERS | singular | n/a |
| gross sales | gross sales | CUSTOM / GROSS_SALES ∨ | RESULTS ∨ | singular ∨ | n/a ∨ |
| discounts | discounts | DISCOUNTS ∨ | OTHERS | singular | n/a |
| net sales | N/A | EXISTING / SALES ∨ | N/A ∨ | N/A | N/A |
| cogs | N/A | EXISTING / COST_OF_SALES ∨ | N/A ∨ | N/A | N/A |
| profit | net profit | GROSS_PROFIT ∨ | RESULTS | singular | N/A |
| sales | sales | IGNORE ∨ | EARNINGS | plural | N/A |

☒ Indicator Match > 90%  ☐ Indicator Match > 75%
☒ Indicator Match > 75%  ☐ Duplicate Indicator

[Export Mapping] — 801

[VALET Home]

FIG. 8I

| Name | Type |
|---|---|
| 910 — vocabulary_extension | Fichier CSV Microsoft Excel |
| 920 — vocabulary_mapping | Fichier CSV Microsoft Excel |

Downloads > mappings

FIG. 9

| | A | B | C | D | E |
|---|---|---|---|---|---|
| 1 | | Label | Id | Confidence | Correction |
| 2 | 0 | units sold (number) | UNITS_SOLD_NUMBER | low | |
| 3 | 1 | manufacturing price | MANUFACTURING_PRICE | low | |
| 4 | 2 | sale price | SALE_PRICE | low | |
| 5 | 3 | gross sales —1011 | GROSS_SALES —1021 | low —1031 | CREATE —1041 |
| 6 | 4 | discounts —1012 | DISCOUNTS —1022 | low —1032 | —1042 |
| 7 | 5 | net sales —1013 | SALES —1023 | low —1033 | CHANGE —1043 |
| 8 | 6 | cogs | COST_OF_SALES | low —1034 | CHANGE |
| 9 | 7 | profit —1014 | GROSS_PROFIT —1024 | medium | CHOOSE —1044 |

FIG. 10

| | A | B | C | D | E | F | G | H | I | J |
|---|---|---|---|---|---|---|---|---|---|---|
| 1 | | Operation | Id | Parent | Neg | Type | Lang | Label | Number | Gender |
| 2 | 0 | add | UNITS_SOLD_NUMBER | OTHER | | OTHERS | en | units sold(number) | singular | n/a |
| 3 | 1 | add | MANUFACTURING_PRICE | OTHER | | OTHERS | en | manufacturing price | singular | n/a |
| 4 | 2 | add | SALE_PRICE | OTHER | | OTHERS | en | sale price | singular | n/a |
| 5 | 3 | new | GROSS_SALES | OTHER | | RESULTS | en | gross sales | singular | n/a |
| 6 | 4 | add | DISCOUNTS | OTHER | | OTHERS | en | discounts | singular | n/a |
| 7 | 5 | add | SALES | GROSS_PROFIT | GROSS_PROFIT | EARNINGS | en | net sales | | |
| 8 | 6 | add | COST_OF_SALES | GROSS_PROFIT | GROSS_PROFIT | RESULTS | en | cogs | singular | |
| 9 | 7 | add | GROSS_PROFIT | EBITDA | | RESULTS | en | profit | | N/A |
| 10 | | | | | | | | | | |

FIG. 11

| Indicator ($) | FY2020 | FY2019 |
|---|---|---|
| Units Sold (Number) | 177 | 202 |
| Manufacturing Price | 17,345 | 21,890 |
| Sale Price | 17,610,000 | 19,405,000 |
| Gross Sales | 17,610,000 | 19,405,000 |
| Discounts | 1,567,250 | 1,937,100 |
| Net Sales | 16,042,750 | 17,467,900 |
| COGS | 12,910,725 | 13,945,604 |
| Profit | 3,132,025 | 3,522,296 |

FIG. 12

DEMO C - Sales Performance - Renewable Energy

*This text has been generated by Yseop's Augmented Financial Analyst application. Please review the alerts in the report for additional information.*

Profit

In 2020, gross profit decreased by 11.1% after a 17.7% rise in 2019. Over the last two fiscal years, the gross profit of all segments increased by 4.6% to $3.1M primarily on an increase of North America of 27.1% driven principally by an increase of:
- wind energy (+22.1%);
- hydro energy (+43.3%)

in spite of a 27.0% decrease of Asia Despite a decrease of government of 52.7%, a steady rise of all products' gross profit of 4.6% over the last two fiscal years to $3.1M originated primarily from an increase of enterprise (+50.9%).

Products details

Gross profit of $3.1M was significantly higher than expected by 105.7%. During the last two fiscal years, gross profit rose steadily (+4.6%) to $3.1M due to an increase of:
- hydro energy (+7.1%);
- wind energy (+2.8%);
- solar energy (+5.8%);

Sales - Segment by product

| In $ M | 31/12/2018 | 31/12/2019 | 31/12/2020 | Variation | Variation % |
|---|---|---|---|---|---|
| Net Sales | 16.4 | 17.5 | 16.0 | -0.4 | -2.2% |

A slight decline in revenue by 2.2% over the last two fiscal years to $16.0M mainly originated from a decrease of Asia (-23.9%) caused by a decrease of East Asia (-23.9%) based principally on a decrease of:
- hydro energy (-44.5%) based primarily on a decrease of large hydro turbine (-60.4%);
- wind energy (-16.5%) based primarily on a 17.8% decrease of onshore wind turbines.

despite an increase of Europe of 26.0%

FIG. 13

ONTOLOGY MAPPING AND ADAPTATION SYSTEMS AND METHODS

FIELD

The techniques described herein relate to the field of automatic generation of natural language text, and more particularly to techniques for generating natural language text (NLT) with a natural language generation system using a target vocabulary.

BACKGROUND

Natural language generation (NLG) is the generation of human-language text (i.e., text in a human language) based on information in non-linguistic form. For example, natural language generation techniques may be used to generate a textual description of a day of trading of a particular stock based on data indicating the stock price and volume throughout the day, to generate a confirmation e-mail for an online purchase made via the Internet from data describing the purchase, or to generate real-time comments about a sporting event using data about the game.

SUMMARY

Some embodiments are directed to a method of generating natural language text, the method comprising: using at least one computer hardware processor to perform: receiving information indicating a target vocabulary for use in generating natural language text, the target vocabulary comprising multiple terms representing multiple respective variables; accessing an ontology of entities used for generating natural language text, wherein each of at least some of the entities in the ontology of entities is associated with one or more respective linguistic attributes; mapping at least some of the multiple terms to entities in the ontology, the mapping comprising: identifying information indicative of correspondences between one or more of the at least some of the multiple terms and one or more respective entities in the ontology; and identifying one or more modifications to make to the ontology to obtain a modified ontology to be used for generating natural language text using the target vocabulary; modifying the ontology, using the one or more modifications and correspondences, to obtain a modified ontology; receiving data indicating values for at least some of the multiple variables; and generating natural language text using the data and information in the modified ontology associated with the at least some of the multiple variables.

Some embodiments provide for a system comprising at least one processor configured to perform: receiving information indicating a target vocabulary for use in generating natural language text, the target vocabulary comprising multiple terms representing respective multiple variables; accessing an ontology of entities used for generating natural language text, wherein each of at least some of the entities in the ontology of entities is associated with one or more respective linguistic attributes; mapping at least some of the multiple terms to entities in the ontology, the mapping comprising: identifying information indicative of correspondences between one or more of the at least some of the multiple terms and one or more respective entities in the ontology; and identifying one or more modifications to make to the ontology to obtain a modified ontology to be used for generating natural language text using the target vocabulary; modifying the ontology, using the one or more modifications, to obtain a modified ontology; receiving data indicating values for at least some of the multiple variables; and generating natural language text using the data and information in the modified ontology associated with the at least some of the multiple variables.

Some embodiments provide for at least one non-transitory computer readable storage medium storing processor-executable instructions that, when executed by at least one processor, cause the at least one processor to perform a method for generating natural language text, the method comprising: receiving information indicating a target vocabulary for use in generating natural language text, the target vocabulary comprising multiple terms representing respective multiple variables; accessing an ontology of entities used for generating natural language text, wherein each of at least some of the entities in the ontology of entities is associated with one or more respective linguistic attributes; mapping at least some of the multiple terms to entities in the ontology, the mapping comprising: identifying information indicative of correspondences between one or more of the at least some of the multiple terms and one or more respective entities in the ontology; and identifying one or more modifications to make to the ontology to obtain a modified ontology to be used for generating natural language text using the target vocabulary; modifying the ontology, using the one or more modifications, to obtain a modified ontology; receiving data indicating values for at least some of the multiple variables; and generating natural language text using the data and information in the modified ontology associated with the at least some of the multiple variables.

The foregoing is a non-limiting summary of the invention, which is defined by the attached claims.

BRIEF DESCRIPTION OF DRAWINGS

Various aspects and embodiments of the disclosure provided herein are described below with reference to the following figures. It should be appreciated that the figures are not necessarily drawn to scale. Items appearing in multiple figures are indicated by the same or a similar reference number in all the figures in which they appear.

FIG. 3A is a representation 121 of information which includes the target vocabulary in table form, in accordance with some embodiments of the technology described herein.

FIG. 3B is an example table 122 including an illustrative target vocabulary, in accordance with some embodiments of the technology described herein.

FIG. 8A is an exemplary display 800 indicating identified correspondences and modifications to make to the ontology presented to a user, in accordance with some embodiments of the technology described herein.

FIG. 8B is an example of a display showing a user selection of an entity ID, in accordance with some embodiments of the technology described herein.

FIG. 8C is an example of a display showing a user selection for mapping a term of the target vocabulary to an existing entity, in accordance with some embodiments of the technology described herein.

FIG. 8D is an example of a display showing a user selecting from one or more entity IDs from a list of entity IDs, in accordance with some embodiments of the technology described herein.

FIG. 8E is an example of a display showing a user selecting from one or more parent entities of the entity identified by ID on a drop down list, in accordance with some embodiments of the technology described herein.

FIG. 8F is an example of a display showing a user changing a mapping between a term of the target vocabulary and a first entity to another entity, in accordance with some embodiments of the technology described herein.

FIG. 8G is an example of a display indicating two entries mapped to a same ontology entity, in accordance with some embodiments of the technology described herein.

FIG. 8H is an example of a display showing a user selection to ignore the lexicalization of a term of the target vocabulary, in accordance with some embodiments of the technology described herein.

FIG. 8I is an example of a display prior to exporting files, in accordance with some embodiments of the technology described herein.

FIG. 9 shows examples of user exported files, in accordance with some embodiments of the technology described herein.

FIG. 10 is an example of a vocabulary mapping file, in accordance with some embodiments of the technology described herein.

FIG. 11 is an example of a vocabulary extension file, in accordance with some embodiments of the technology described herein.

FIG. 12 shows an exemplary data table 1200 with data used in NLT generation, in accordance with some embodiments of the technology described herein.

FIG. 13 is an example of text 1300 generated using the natural language generation module, in accordance with some embodiments of the technology described herein.

DETAILED DESCRIPTION

Figure 1A:
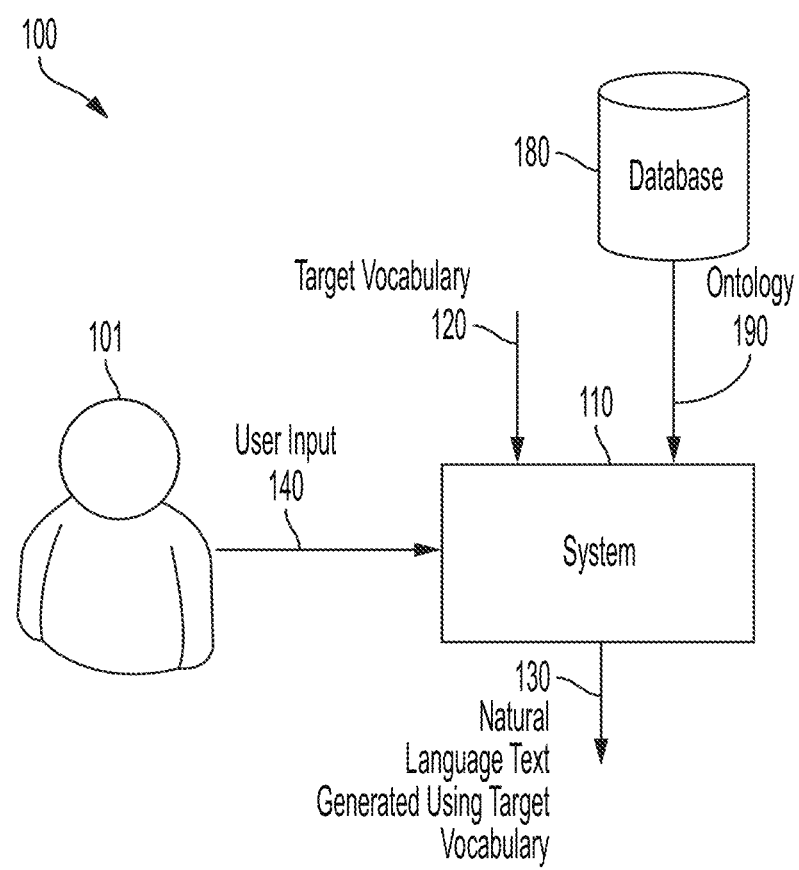
FIG. 1A is a diagram of an illustrative environment 100 for generating natural language text 130, in accordance with some embodiments of the technology described herein.

Many natural language generation (NLG) systems use ontologies that represent relationships between distinct entities to generate natural language text. An entity represents a concept (e.g., "profit") that may be rendered into natural language text (NLT) and may contain information indicating how the concept is to be rendered into natural language text). For example, such information may include a collection of one or multiple terms or phrases that may be used to express the concept in natural language (e.g., the terms "net profit," "money earned," may be specific ways in which the concept of "profit" can be expressed in natural language).

At least some information contained in an entity may be stored in one or more attributes. For example, the attributes may include one or more attributes for storing terms (e.g., one or more words, one or more phrases, or one or more sentences) that can be used to render the concept into text. As another example, the attributes may include linguistic attributes, which may indicate how the concept represented by the entity is to be rendered into natural language text. In some embodiments, the linguistic attributes of an entity representing a concept may specify various types of information for rendering the concept into text including, but not limited to, gender (e.g., masculine feminine, neuter), number (e.g., singular or plural), language (e.g., English, French, Hindi, Mandarin, etc.), and part of speech information (e.g., noun, adjective, verb, adverb, etc.).

Users employ such NLG systems to generate natural language text (e.g., reports, narratives, blog posts, etc.) from the data so that the data is presented to people in a form that is easy to read and understand. For example, a company may input data indicating its profit and loss numbers to an NLG system to generate a corporate report for its shareholders. However, different companies may use different terms from those in the ontology having an equivalent meaning. For example, a first company may use the term "gross profit" and a second company may use the term "total profit", while the ontology may have only an entity "profit." Similarly, a company may use a different terminology than what is provided in existing ontologies of NLG systems.

As a result, it is often difficult to use such NLG systems with data using vocabulary that is specific to a user or user group to generate accurate and complete text from data. Because the terminology is different from the terms of an ontology used in conventional natural language generation systems, it is often difficult or impossible to know linguistic attributes of the different terms and as a result, impossible to render into natural language text. As such, it is desirable to be able to determine relationships between terms of an ontology for the NLG system and the terms of a user or user group-specific terminology and customize or modify the ontology of an NLG system to include the terms of the user or user group-specific terminology (e.g., by adding to the ontology where needed, for example, when the ontology lacks an entity).

Conventional approaches to determining relationships between terms of an ontology and terms specific to a company are predominately manual and would be impractical, if not impossible, to accomplish at a large scale. For example, doing so would include hiring people to review documents used by a company and determining terms with equivalent meaning among the documents and ontologies. Ontologies may often be hundreds to millions of entities large.

To address some of these shortcomings of conventional approaches, the inventors have developed automated techniques for rapidly customizing a natural language generation system to for use by different users (e.g., by different companies for different natural language generation tasks). The technology developed by the inventors allows for rapid customization of an ontology in an NLG system to adapt the NLG system to generate natural language text in a way that is tailored to a specific user's preferences.

For example, the techniques may automatically map terms of the specific user's terminology to entities that have terms that are determined to be similar (e.g., as quantified by matching scores) and indicate when no entity was found to be similar enough (e.g., where a matching score does not exceed a threshold). The system may take in user input, which may be used to modify the ontology. Subsequently, the linguistic attributes of entities (e.g., previously existing and/or newly added) of the modified ontology that correspond to terms of the target vocabulary may be used to render data using the user specific terminology into text.

Accordingly, some embodiments provide a method of generating natural language text, the method comprising: (A) receiving information (e.g., a text file, data structure such as a list, table, array, etc.) indicating a target vocabulary for use in generating natural language text, the target vocabulary comprising multiple terms representing multiple respective variables; (B) accessing an ontology of entities used for generating natural language text, wherein each of at least some of the entities in the ontology of entities is associated with one or more respective linguistic attributes (e.g., gender, number, terms etc.); (C) mapping at least some of the multiple terms to entities in the ontology, the mapping comprising: (1) identifying information indicative of correspondences between one or more of the at least some of the multiple terms and one or more respective entities in the ontology; and (2) identifying one or more modifications to make to the ontology to obtain a modified ontology to be used for generating natural language text using the target vocabulary; (D) modifying the ontology, using the one or more modifications and correspondences, to obtain a modified ontology (e.g., by modifying existing entities to include one or more additional terms, or creating new entities); (E) receiving data indicating values for at least some of the multiple variables; and (F) generating natural language text using the data and information in the modified ontology associated with the at least some of the multiple variables.

In some embodiments, identifying information indicative of correspondences may include calculating a first matching score between each of the one or more terms and one or more entities in the ontology. For example, the first matching score may be a measure of similarity between the terms and the entities of the ontology. In some cases, the first matching score may be a function of an edit distance between terms of the entities of the ontology and the terms of the target vocabulary. Identifying information indicative of correspondences may further include identifying, for each of the one or more terms, one or more entities in the ontology for which the first matching score exceeds a first threshold. For example, if the first matching score for a term and entity of an ontology exceeds a value (e.g., 90), that may indicate that the term and entity are similar and could indicate that the term and entity have a similar or equivalent meaning and/or can be used in a similar manner. In some cases, identifying information indicative of correspondences comprises identifying that there are no correspondences between one or more of the at least some of the multiple terms and one or more respective entities in the ontology. For example, there may be no entity similar to the term of the target vocabulary.

In some embodiments, identifying information indicative of correspondences includes: (A) calculating a first matching score between each of the one or more terms and one or more entities in the ontology; (B) in response to determining that there is no entity in the ontology for which the first matching score exceeds a first threshold; (C) identifying, for each of the one or more terms, one or more entities in the ontology for which the first matching score exceeds a second threshold; (D) calculating a second matching score between each of the one or more terms and one or more entities in the ontology; and (E) identifying, for each of the one or more terms, one or more entities in the ontology having a highest second matching score. For example, if there is no entity for a term in the target vocabulary that exceeds the first threshold (e.g., no entity is similar enough), then a second matching score may be used. In some examples, the second matching score may be determined using semantic matching.

In some examples, the second matching score may be determined using a cosine distance between a term of the one or more terms and one or more entities in the ontology. For example, the second matching score is determined using a cosine distance of a first vector representing a term of the one or more terms and a second vector representing one or more entities in the ontology.

In some examples, one or more modifications includes adding one or more new entities to the ontology based on one or more terms of the multiple terms for which there is no entity in the ontology for which the first matching score exceeds the second threshold. For example, if there is a term for which no entity can be matched, the system may prompt the user for user input (e.g., through a graphical interface) indicating a new entity to be added to the ontology.

In some embodiments, one or more modifications comprises modifying one or more entities of the ontology based on one or more terms of the multiple terms for which there is no entity in the ontology for which the first matching score exceeds the second threshold. In some examples, identifying one or more modifications includes identifying one or more terms of the multiple terms for which there is no entity in the ontology for which the first matching score exceeds the second threshold.

In some examples, the method further comprises displaying, using a graphical interface, the correspondences and the one or more modifications to a user. In some embodiments, the correspondences can be displayed in a first color (e.g., yellow, green) and the one or more modifications are displayed in a second color (e.g., red). For example, this could help the user recognize, at a graphical interface, whether or not an entity was found in the ontology that corresponds to each term.

In some embodiments, modifying the ontology comprises displaying, to a user, the identified one or more modifications; receiving, from the user, information comprising one or more correspondences between one or more of the at least some of the multiple terms and one or more respective entities in the ontology; and adding and/or modifying one or more entities in the ontology based on the information. In some embodiments, modifying the one or more entities in the ontology comprises associating a term of the multiple terms to an entity in the ontology.

In some embodiments, the linguistic attributes may include gender and/or number. The linguistic attribute might also include the language. The linguistic attributes may be used in generating the text.

In some examples, the techniques may further include indicating, to a user, when an entity of the ontology is mapped to two or more terms of the target vocabulary. For example, the user may not want two different terms in the target vocabulary to be mapped to the same entity in the ontology.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A is a diagram of an illustrative environment 100 for generating natural language text (NLT) 130, in accordance with some embodiments of the technology described herein. The environment 100 includes a system 110. The system 110 may be configured to access an ontology 190 from a database 180 and a target vocabulary 120, including, for example, terminology used by the user or the company of the user. The system 110 may also take in user input 140 from a user 101. The system may generate natural language text (NLT) 130 using the accessed ontology 190, target vocabulary 120, and user input.

In some embodiments, the ontology 190 may include entities and may also include information indicating relationships between distinct entities. In some examples, an entity may represent a concept that can be rendered into natural language text.

As described herein, an entity may represent a concept that may be rendered into natural language text. The entity may also include one or more linguistic attributes of the concept indicating how one or more of the vocabulary words is to be rendered into natural language text (e.g., as a noun or verb, as being a plural or singular noun, etc.). For example, an entity may specify one or multiple attributes, such as linguistic attributes, which may take on values including numerical and/or string values. In some embodiments, an entity may be instantiated by assigning particular values to attributes of the entity—the resulting entity instance will be associated with specific linguistic attribute values and, therefore, with a specific rendering into natural language text. As such, multiple instances of the same entity may be generated such that the resulting entity instances will have different attribute values and may be used to render the concept represented by the entity into different strings of natural language text. In some embodiments, entities, instances of data entities, their attributes and/or their attribute values may be stored using data structures such as one or more tables, records, lists, and/or any other suitable data structures, as aspects of the disclosure described herein are not limited in this respect.

In some embodiments, an entity may also include, as attribute, a collection of one or multiple terms that may be used to express the concept in natural language. The terms may be related or associated with one another. The entity may also have an identifier attribute (e.g., profit) identifying the collection of terms, and one or multiple terms of the collection may relate to the identifier (e.g., gross profit, net profit, etc.). For example, a term included in an entity may have a similar or equivalent meaning as the identifier of the entity. The identifier attribute may be used by the system to identify the entity.

As described herein, entities of ontology 190 may include linguistic attributes indicating how one or more of the terms of each entity may be rendered into natural language text. The linguistic attributes may include attributes such as "operation", "id" (e.g., identification), "parent", "neg", "type", "lang", "term", "number", and "gender".

In some embodiments, the linguistic attribute "operation" indicates a modification to the ontology. For example, values of the operation linguistic attribute may include "new", "add", "del", "mod" and "reparent." A value of "new" may indicate that a new entity is created, together with its attributes (term, etc.). A value of "add" may indicate that a new term is added to an existing entity. A value of "del" may indicate deletion of a term from an existing entity, or deletion of another attribute of the entity. A value of "mod" may indicate a change of an entity term attribute. In some examples, other terms of the entity may be discarded, and only the new one(s) may be used. A value of "reparent" may indicate moving the entity in the ontology.

In some embodiments, the "id" linguistic attribute is an identifier of the entity. In some embodiments, the identifier may be written as a combination of capital letters and quotation marks.

In some embodiments, the "parent" linguistic attribute may be an identifier of the parent entity of the entity to which the term of the target vocabulary is mapped.

In some embodiments, the "neg" linguistic attribute indicates a negative contribution of the entity to its parent (e.g., if set to non-blank). For example, an indicator "Cost of sales" may have a parent entity "EBITDA" (earnings before interest, taxes, depreciation, and amortization). The indicator "Cost of sales" may indicate a negative contribution to its parent entity "EBITDA". The value of the EBITDA may be a deduction of the values of negative contributing indicators such as "Cost of Sales" to positive contributors (e.g., such as "Earnings").

In some embodiments, the "type" linguistic attribute indicates a parent entity to which the entity belongs. For example, the type may be ASSETS, EXPENSES, TAXES, etc.

In some embodiments, the "language" linguistic attribute indicates the language of the data (e.g., of the term of the entity). In some embodiments, the language attribute is written as a 2-letter code ("en" for English, "fr" for French, etc.).

The "terms" linguistic attribute denotes one or more terms of the entity. In some embodiments where there are multiple terms of an entity, the entity may also have information indicating a preferred term of the multiple terms in the specified language and domain of use for lexicalization.

The "number" linguistic attribute may be a grammatical attribute of the entity and can be either "singular" indicating that the entity is a singular entity or "plural" indicating that the entity is a plural entity.

The "gender" linguistic attribute may be a grammatical attribute of the entity and can be "masculine", "feminine", "neutral", and/or the like when applicable. For example, this may be applicable to languages that have gendered words, for example, the gender attribute may be left empty and/or ignored when the language is set to English for example.

In some embodiments, the linguistic attributes may also include a flag (e.g., "UseIfNeg"). The linguistic attribute may be a flag that is activated to alert the NLG system when the "Neg" linguistic attribute is used, as described above.

In some examples, the linguistic attributes may be used by the system 110 to generate the natural language text 130. The ontology may be stored in a database 180.

In the example of FIG. 1A, the database may be external to the system 110. In other examples, the database may be a part of the system 110. In some examples, the ontology may be organized in a hierarchy of entities.

In some embodiments, the system 110 may be configured to access the ontology 190 from database 180. This may be done in any suitable way. In some embodiments, the system may be configured to obtain data from the database 180, for example by requesting and pulling data from the database 180 or by being provided data by the database 180). The ontology 190 or aspects of the ontology 190 may be provided via a communication network (not shown), such as the Internet or any other suitable wired or wireless network, as aspects of the technology described herein are not limited in this respect.

A target vocabulary may be information comprising terminology used by the user or the company of the user. For example, the target vocabulary may be stored in a data structure such as in a list, array or table form of terms used. Alternatively or additionally, the target vocabulary may be stored in a file. In some embodiments, the target vocabulary may be provided to the system (e.g., a user or other system may input the target vocabulary into the system). For example, the target vocabulary, or a file or data structure including the target vocabulary, may be uploaded to the system 110. Alternatively, the system may be configured to access the target vocabulary in a similar manner as the system may be configured to access the ontology from database 180 as described herein. Example target vocabularies are described herein including with reference to FIGS. 3A and 3B. The terms of the target vocabulary may represent different variables associated with different values. For example, the term "profit" may be a variable having a numerical value such as $100 or $5,000.

As described herein, the system 110 may be configured to determine relationships between terms of the ontology 190 and the terms of target vocabulary 120 which may be specific to a particular user or user group (e.g., company, business, etc.). In some embodiments, the system may also be configured to receive user input 140. The user input 140 may be used to facilitate mapping between the ontology 190 and target vocabulary 120. The user input 140 may indicate modifications to be made to the ontology 190, such as new entities to add to the ontology and/or changes to existing entities of the ontology, for example, based on the target vocabulary. Example components of system 110 are described herein including with reference to FIG. 1B.

In some embodiments, the natural language text 130 generated by the system 110 using the target vocabulary may be a phrase, a single sentence, and/or multiple sentences. In some embodiments, the natural language text (NLT) 130 generated by system 110 may be output to one or more destinations, for example, one or more other devices, one or more other users, and/or to a database or data store. The generated NLT 130 may subsequently be used as part of content such as a report, a document, a webpage and/or the like.

Figure 1B:
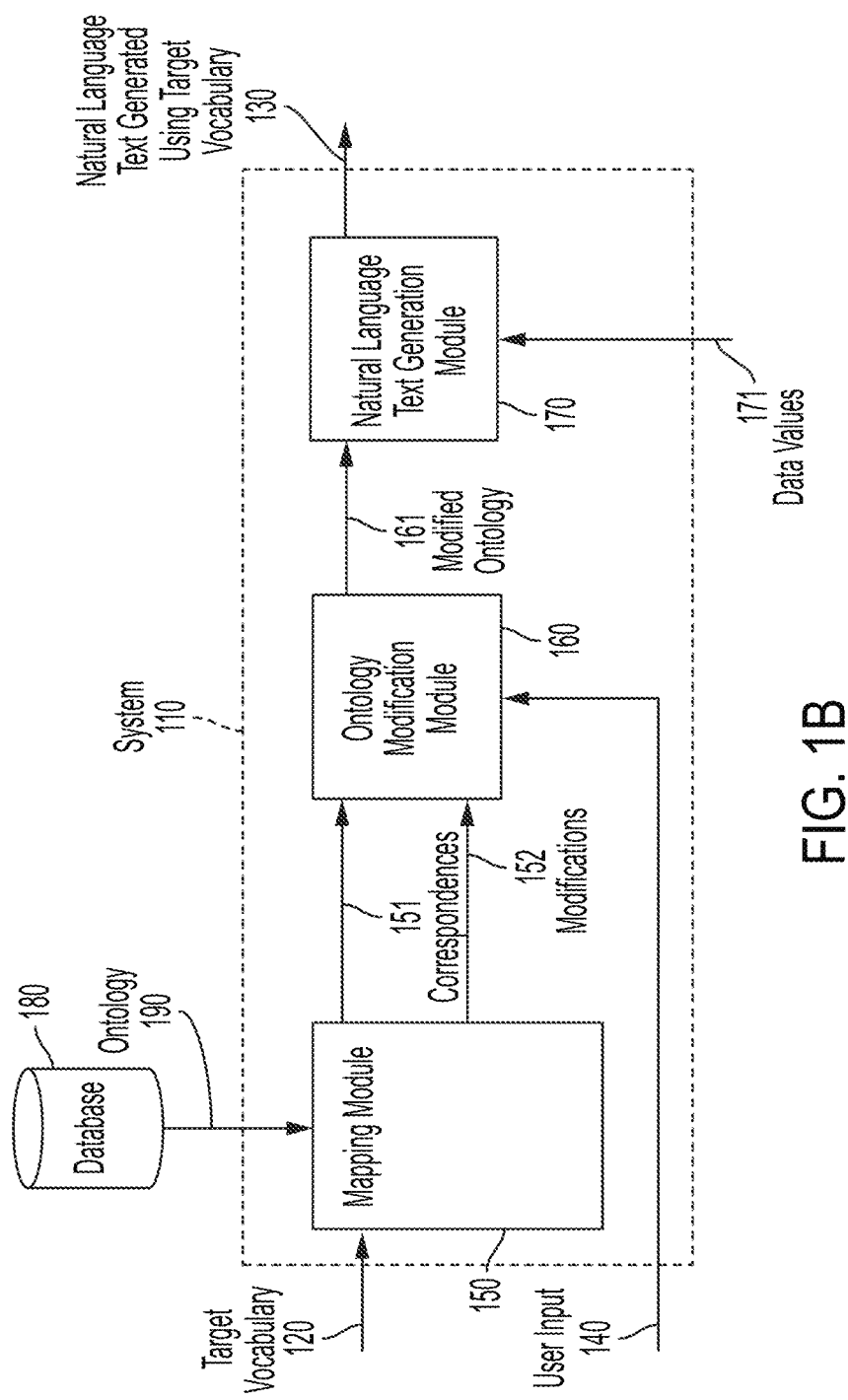
FIG. 1B is a diagram of exemplary system 110 of environment 100, in accordance with some embodiments of the technology described herein.

FIG. 1B is a diagram of an exemplary system 110 of FIG. 1A, in accordance with some embodiments of the technology described herein. As described herein, the system 110 may be configured to determine relationships between terms of the ontology 190 and the terms of target vocabulary 120 which may be specific to a particular user or user group (e.g., company or business). The system 110 includes a mapping module 150 for determining correspondences between terms of the target vocabulary and entities in the ontology, ontology modification module 160 for modifying the ontology 190, and natural language text generation module 170 for generating NLT with the modified ontology.

The system 110 may access target vocabulary 120 and an ontology 190 (e.g., from the database 180). The mapping module of the system 110 may be configured to map terms of the target vocabulary 120 to entities of the ontology which may include, for example, determining correspondences between the terms of the target vocabulary and entities of the ontology. The correspondences may indicate which entities include terms (e.g., terms) determined to be similar to terms of the target vocabulary (e.g., similar in meaning, similar in spelling, etc.). The mapping module 150 may be configured to determine a similarity between terms belonging to or associated with entities of the ontology and terms of the target vocabulary by calculating one or multiple matching scores.

In some embodiments, the matching score may be calculated based on an edit distance between a term of the target vocabulary and a term or sequence of terms of an entity of the ontology. In some examples, the edit distance may be a value indicating the minimum number of operations (e.g., deleting a letter, inserting a letter and/or substituting a letter), required to transform one term to the other term. The edit distance may be any suitable edit distance such as Levenshtein distance.

In some embodiments, the matching score may be calculated based on a cosine distance between a term of the target vocabulary and a term of an entity of the ontology. For example, the matching score may be a cosine distance between a first vector representing the term of the target vocabulary and a second vector representing a term of the entity in the ontology.

In some embodiments, the mapping module 150 may determine that an entity corresponds to a term in the target vocabulary if the entity includes a term for which a matching score (e.g., between the term of the entity and the term of the target vocabulary) that exceeds than a threshold. In some examples, the mapping module 150 may determine that the entity corresponds to the term in the target vocabulary if the entity includes a term for which the matching score is the highest of other terms of other entities of the ontology.

In some embodiments, the mapping module 150 may be configured to calculate a first and second matching score. In some examples, the first matching score may be calculated based on an edit distance and the second matching score may be calculated based on a cosine distance.

Figure 7:
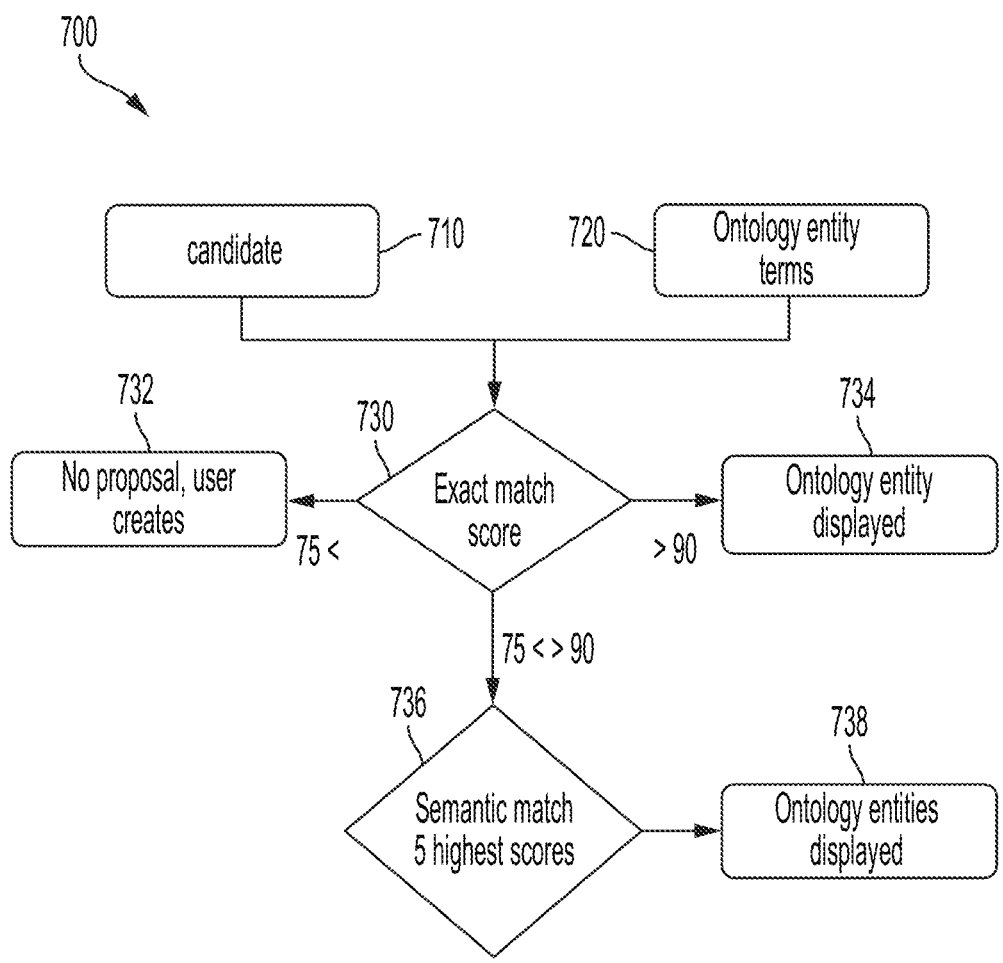
FIG. 7 is a flowchart of an illustrative process for determining correspondences between a term of the target vocabulary of the user and the ontology, in accordance with some embodiments of the technology described herein.

In some examples, as described further in relation with FIG. 7, the mapping module 150 may be configured to calculate a second matching score if a value of a first matching score between a term of the entity and a term of the target vocabulary does not exceed a first threshold but does exceed a lower second threshold. The mapping module may be configured to determine a correspondence between the entity and the term of the target vocabulary if the entity has a term for which a second matching score exceeds a threshold value.

In some embodiments, the mapping module may be configured to identify one or more modifications to make to the ontology. The identified modifications to make may indicate terms of the target vocabulary for which a similar entity could not be found. For example, the mapping module may identify terms of the target vocabulary for which there are no terms of the entities in the ontology for which a matching score exceeds a threshold. The user may provide user input 140 indicating modifications to be made to the ontology, such as new entities to add to the ontology and/or changes to existing entities of the ontology. The mapping module may subsequently transmit correspondences 151 and modifications 152 to the ontology modification module 160.

The ontology modification module may be configured to modify the ontology based on the correspondences 151, modifications 152 and input of the user. Modifying the ontology based on the correspondences 151 may include adding the term of the target vocabulary to the collection of terms of the corresponding entity. In some examples, a term of the corresponding entity may be equivalent to the term of the target vocabulary, and the correspondence may not modify the ontology. In some examples, modifying the ontology based on the modifications 152 may include using the user input to add a term of the target vocabulary to the collection of terms of an entity indicated by a user. In some examples, modifying the ontology based on the modifications 152 may include using the user input to add a new entity defined by information specified by the user input. The user input may also specify linguistic attributes for the new entity. In some embodiments, the user may export files including data on the modified ontology 161.

The modified ontology 161 may then be transmitted to the natural language text generation module 170. The natural language text generation module 170 may subsequently use the modified ontology to generate natural language text 130, for example, using the process 200 described herein including with reference to FIG. 2. For example, the NLT generation module may use the linguistic attributes of entities (e.g., previously existing and/or newly added) corresponding to terms of the target vocabulary to render data using the terms of the target vocabulary into text.

The NLT generation module may also take in further data, such as data values 171, as input. For example, the NLT generation module may take in data such as values associated with certain terms of the target vocabulary (e.g., a "profit" of 100). FIG. 12 shows an exemplary data table with data used in NLT generation. The data values may be received by the generation module as a file, and/or a data structure such as a list of values, an array, or a table.

As described herein, the natural language text 130 generated by the system 110 using the target vocabulary may be a phrase, a single sentence, and/or multiple sentences and may be output to one or more destinations. The generated NLT 130 may subsequently be used as part of content such as in reports, documents, etc.

Figure 1C:
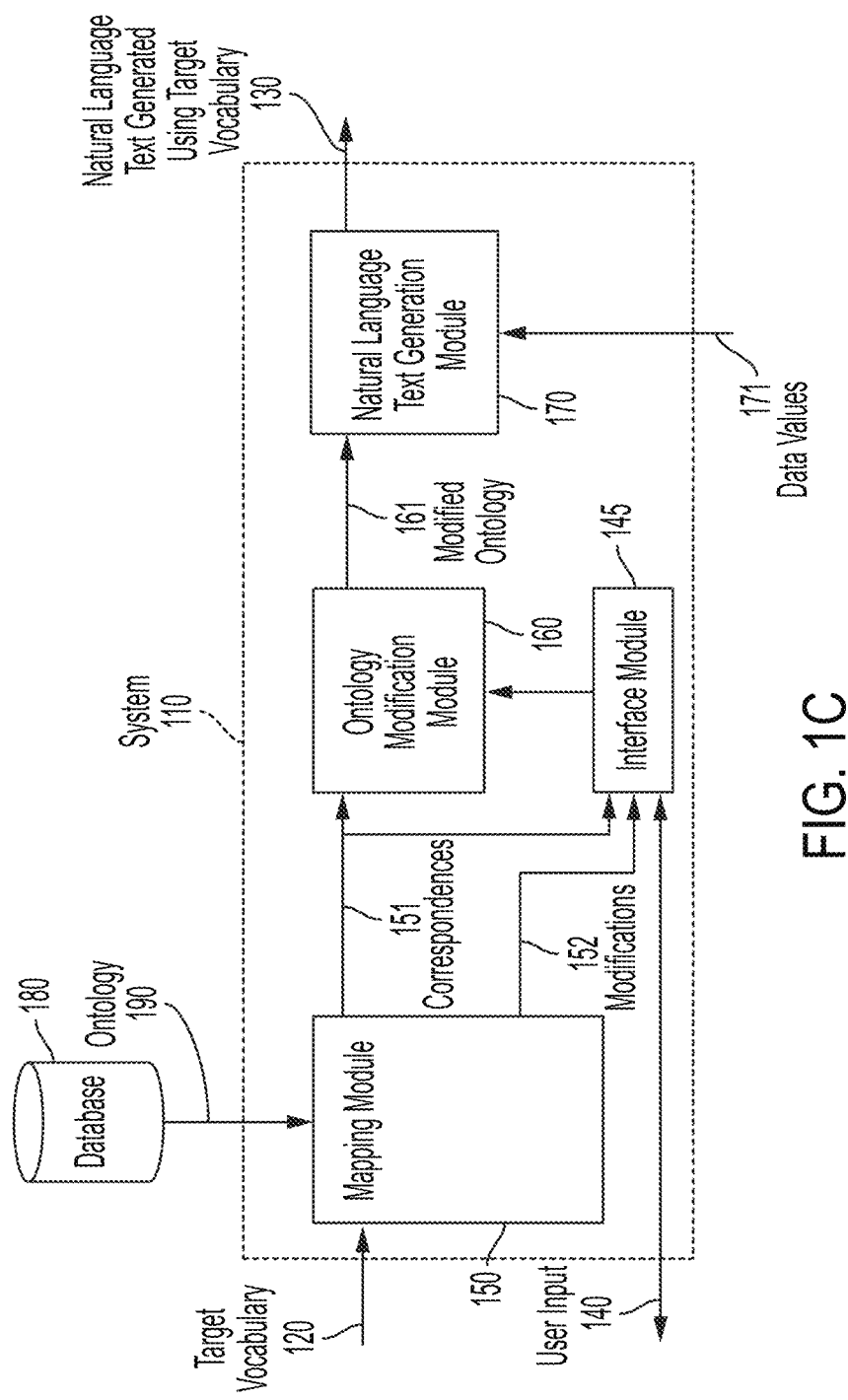
FIG. 1C is a diagram of another exemplary system 110 comprising an interface module 145, in accordance with some embodiments of the technology described herein.

In some embodiments, the system 110 may additionally include interface module 145. For example, FIG. 1C is a diagram of another exemplary system 110 comprising an interface module 145, in accordance with some embodiments of the technology described herein. The interface module 145 can be used to display the correspondences 151 and/or modifications 152 to the user. The user 140 may additionally input the user input 140 via the interface module 145. The interface module 145 may be any suitable interface. For example, the interface module may be a display capable of displaying text and/or images, with input methods such as a keyboard, mouse, touch screen, etc.

Figure 2:
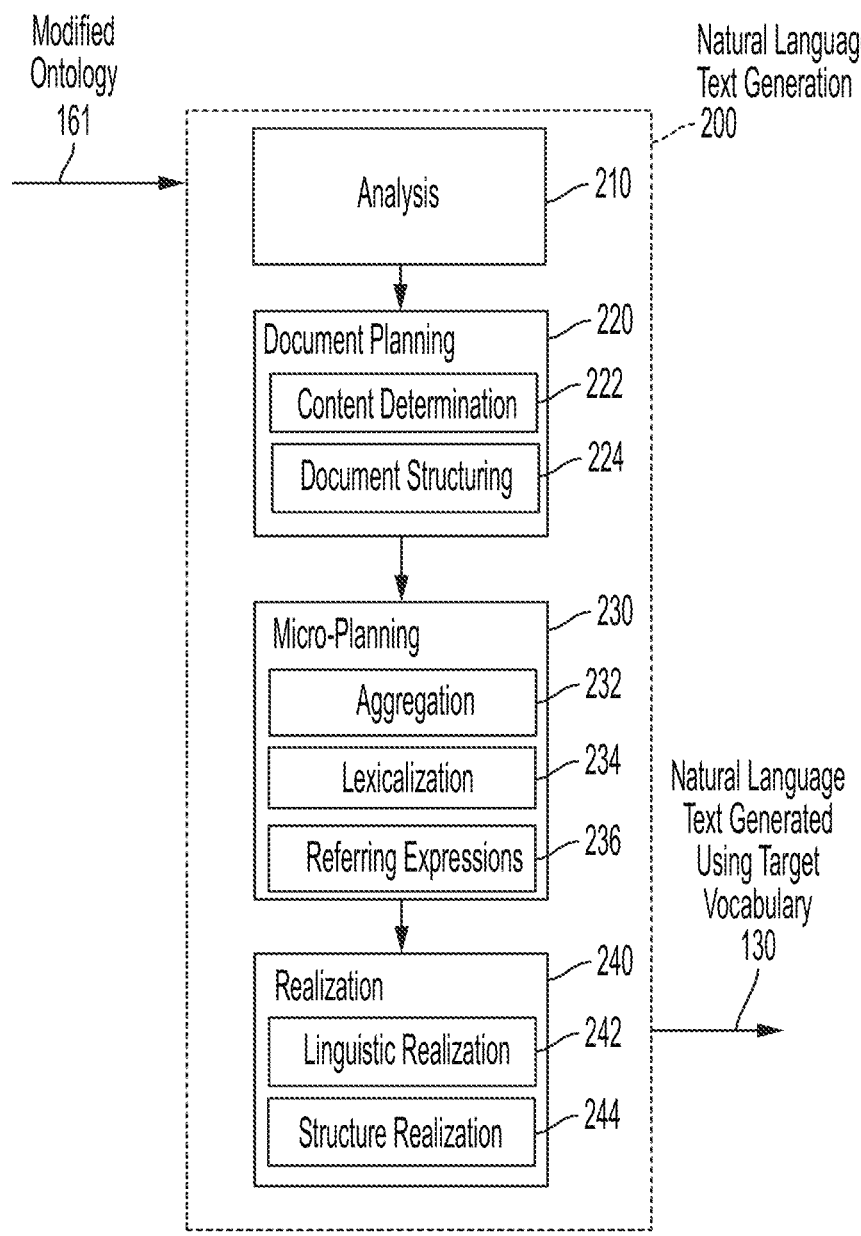
FIG. 2 is a diagram illustrating processing stages of natural language generation process 200 performed by natural language generation module 170, in accordance with some embodiments of the technology described herein.

FIG. 2 is a diagram illustrating processing stages of natural language generation process 200 performed by natural language generation module 170, in accordance with some embodiments of the technology described herein. The natural language generation module 170 may perform stages of the natural language generation process 200 to generate the natural language text (NLT) 130. The NLG process 200 may transform information into human language text using multiple stages of processing. The information may include, for example, the modified ontology 161 as well as values associated with vocabulary (e.g., 100 associated with the vocabulary term "profit"). The multiple stages of processing of the NLG process may include an analysis stage 210, a document planning stage 220, a micro-planning stage 230 and a realization stage 240.

As illustrated in FIG. 2, the document planning stage 220 may include a content determination stage 222 and a document structuring stage 224. In the content determination stage, NLG generation module 170 may obtain content to be expressed in natural language text. In the document structuring stage, NLG system 100 may determine the rhetorical structure of the text to be generated. For example, to generate natural language text about the weather, information about the weather may be obtained in the content determination stage (e.g., information indicating the temperature and information indicating the likelihood of rain) and organized for presentation in the document structuring stage (e.g., by determining that information indicating the likelihood of rain should be presented before information indicating the temperature).

The micro-planning stage 230 may involve determining, based at least in part on the document plan, a syntactic structure for the text to be generated. The micro-planning stage may include an aggregation stage 232, a lexicalization stage 234, and a referring expression stage 236. The aggregation stage 232 may involve determining boundaries between sentences. The lexicalization stage 234 may involve choosing words to describe particular concepts to be expressed in the text to be generated. The referring expression stage 236 may involve selecting expressions, for use in the text to be generated, to refer to concepts that appear more than once in the text (e.g., selecting the pronoun "it" to refer to "the weather" in a portion of the text to be generated).

The realization stage 240 of the NLG process 200 may involve transforming the syntactic structure of the document to be generated into text. The realization stage includes a linguistic realization stage 242 and a structural realization stage 244. The linguistic realization stage may involve generating actual text according to rules of syntax, morphology, and orthography, and may include putting words in order, conjugating verbs, ensuring adjective-noun agreement, etc. During the structural realization stage 244, the text generated in the linguistic realization stage 242 may be output in a desired format (e.g., a PDF file, an XML file, etc.). The above-described tasks may be performed by NLG system 170, as shown in FIG. 1B.

As described herein, the target vocabulary may be information comprising terminology used by the user or the company of the user and which may be specific to the user and/or company. In some examples, the target vocabulary may be a list of terms or phrases stored in a data structure such as in a list, array or in a table form.

For example, FIG. 3A is a representation of a target vocabulary in table form, in some embodiments. The table 121 may include one or more terms/phrases of the target vocabulary (e.g., target vocabulary 120) in each entry of the table. For example, table 121 includes terms 121A-121F. The terms and/or phrases of the target vocabulary may be organized into a single column of the table. In some examples, the table may be an indexed table, as in the example of FIG. 3A. For example, each of the target vocabulary terms 121A-F may be associated with a number (e.g., 121A to index 1, 121B to index 2, etc.). FIG. 3B shows an exemplary table 122 including an illustrative target vocabulary. The target vocabulary of table 122 includes terms and phrases such as 'Indicator' 122A, 'Units Sold (number)' 122B, 'Manufacturing Price' 122C, 'Sale Price' 122D, 'Gross Sales' 122E, 'Discounts' 122F, 'Net Sales' 122G, 'COGS' 122H, 'Profit' 122I, and 'Sales' 122J.

Figure 4A:
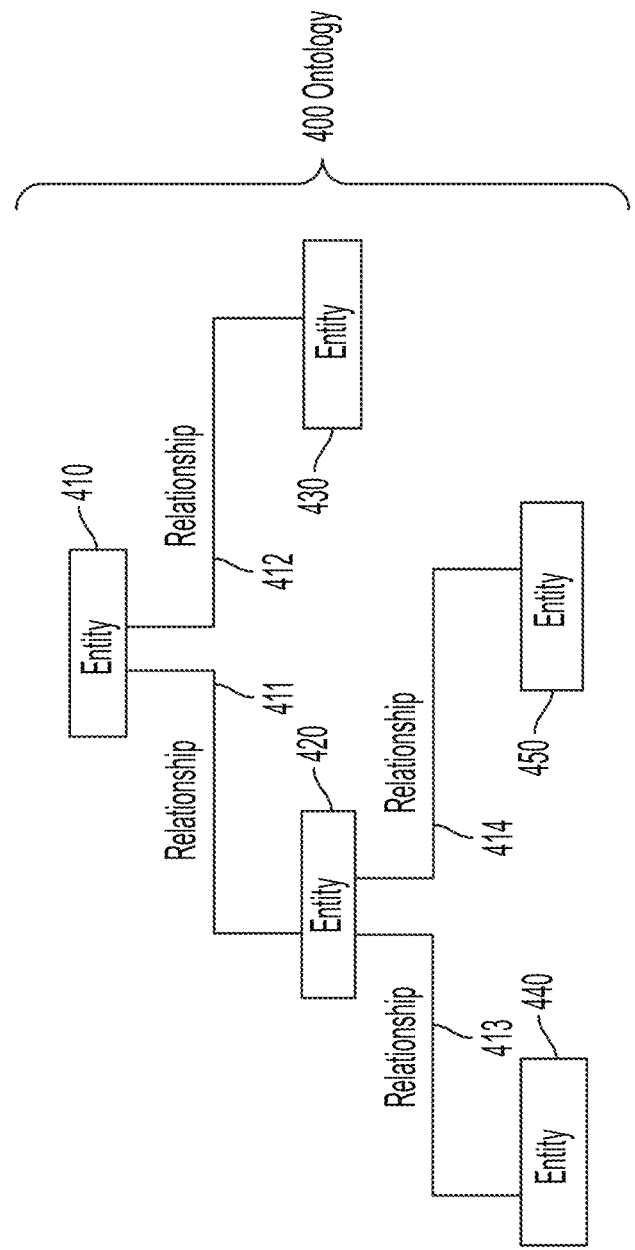
FIG. 4A is a representation 400 of an ontology including entities and relationships between entities, in accordance with some embodiments of the technology described herein.

FIG. 4A is a representation 400 of an ontology including entities and relationships between entities, according to some embodiments. As described herein, the ontology may be organized in a hierarchy of entities defined, for example, through relationships between the entities. For example, exemplary ontology 400 comprises entities 410, 420, 430, 440 and 450. One or more entities are related through relationships 411-414. For example, entity 410 is related to entity 420 by relationship 411, entity 410 is related to entity 430 by relationship 412, entity 420 is related to entity 440 by relationship 413, and entity 430 is related to entity 450 by relationship 414. For example, a relationship between a first and second entity could indicate that the first entity has a similar meaning as the second entity or that the first entity is a type of the second entity, and/or could indicate any suitable relationship between the entities. In some embodiments, the first entity may have one or more attributes that are the same as the second entity. For example, the first entity may inherit the one or more attributes of the second entity. In some embodiments, the relationships 411-415 may also indicate that first entity is a "child" of the second entity and that the second entity is a "parent" of the first entity. For example, the entity 410 may be a parent entity of entities 420 and 430 and entities 420 and 430 may be children entities of the entity 410. This may indicate for example, that entities 420 and 430 are types of entity 410, but that entity 410 is not a type of entity 420 and 430.

Figure 4B:
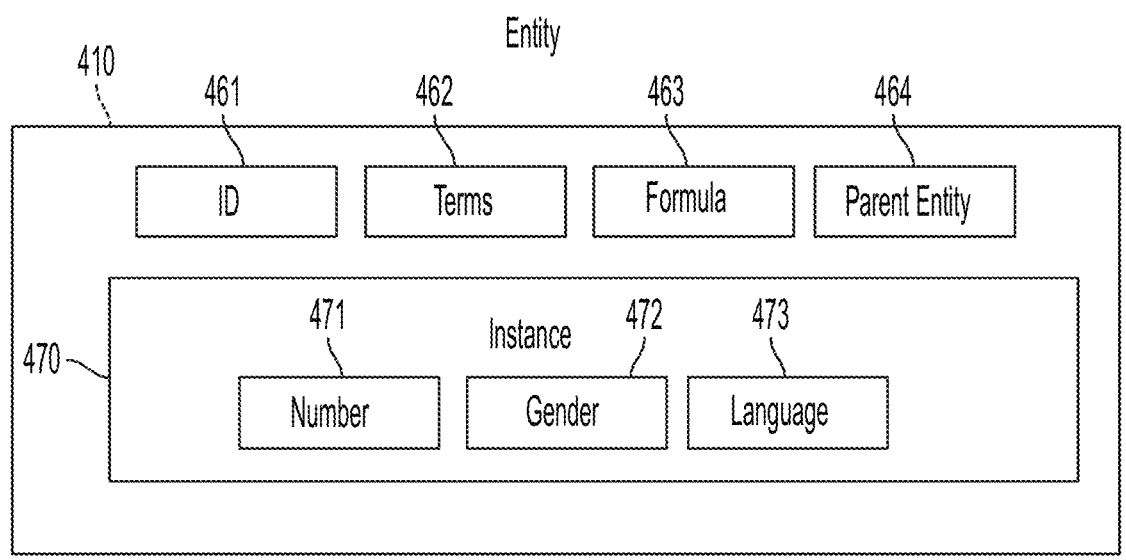
FIG. 4B is an exemplary entity 410 of the ontology 400, in accordance with some embodiments of the technology described herein.

As described herein, each entity may represent a concept (e.g., "profit") that may be rendered into natural language text (NLT). Each entity may contain information indicating how the concept is to be rendered into natural language text. Additionally, an entity can include, or be associated with a collection of one or multiple terms that may be used to express the concept in natural language (e.g., "net profit," "money earned," etc.). A term may include one or multiple words, phrases, and/or sentences. The entity may also include one or more linguistic attributes of the concept indicating how one or more of the vocabulary words is to be rendered into natural language text (e.g., as a noun or verb, as being a plural or singular noun, etc.). For example, FIG. 4B is an exemplary entity 410 of the ontology 400, according to some embodiments.

The exemplary entity 410 may be a data structure with one or more attributes and attribute values conveying information regarding the entity, as described herein. For example, the entity 410 may include one or multiple values such as an identification (ID) value 461, a term value 462, a formula value 463, a parent entity value 464, and instances 470. In some embodiments, the entity may be associated or linked to instances 470 (e.g., rather than including them in the data structure itself).

The identification (ID) value may be a value used to identify the entity at the system and/or processor (e.g., identifying string used to search, etc.).

The terms value 462 may indicate one or more terms used to express the concept in natural language. In some examples where there is more than one term, a preferred term may also be indicated. The preferred term may be used to represent the entity when lexicalized and may be used in combination with other information of the entity during natural language generation.

The formula attribute 463 may indicate an associated formula, for example, a formula used to calculate a value of the entity, and may also indicate what entities are used in the formula.

The parent entity value 464 may indicate a parent entity of which the entity is a child.

The entity may also include other attributes and information. For example, the entity may include information indicating a standard, such as a financial standard (e.g., financial reporting standard). The entity may include or indicate the type of the unit of the entity. The entity may also include the contribution of the entity to its direct parent. The entity may also include a attribute for comments, description, and/or the like.

Each entity may be lexicalized in any of numerous ways. For example, an entity with a term "profit" may be lexicalized in English or French, as an acronym, or using a positive or negative equivalent. Each entity may have one or more instances (e.g., instance 470) corresponding to distinct possible lexicalizations. Each instance may include attributes indicating how the entity is to be rendered into natural language text (NLT) for the specific lexicalization. For example, in the example of 4B, the entity 410 has one instance 470 corresponding to one possible lexicalization. The instance 470 has attributes such as number 471, gender 472, and language 473. The number attribute 471 may indicate whether the entity is lexicalized as being plural or singular. The gender attribute 472 may indicate whether the entity is lexicalized as feminine, masculine, neutral, and or the like (e.g., feminine nouns in French). The language attribute 474 may indicate a language in which the entity is lexicalized. In some embodiments, other attributes may also be included, such as described further in relation with FIG. 5A.

Figure 5A:
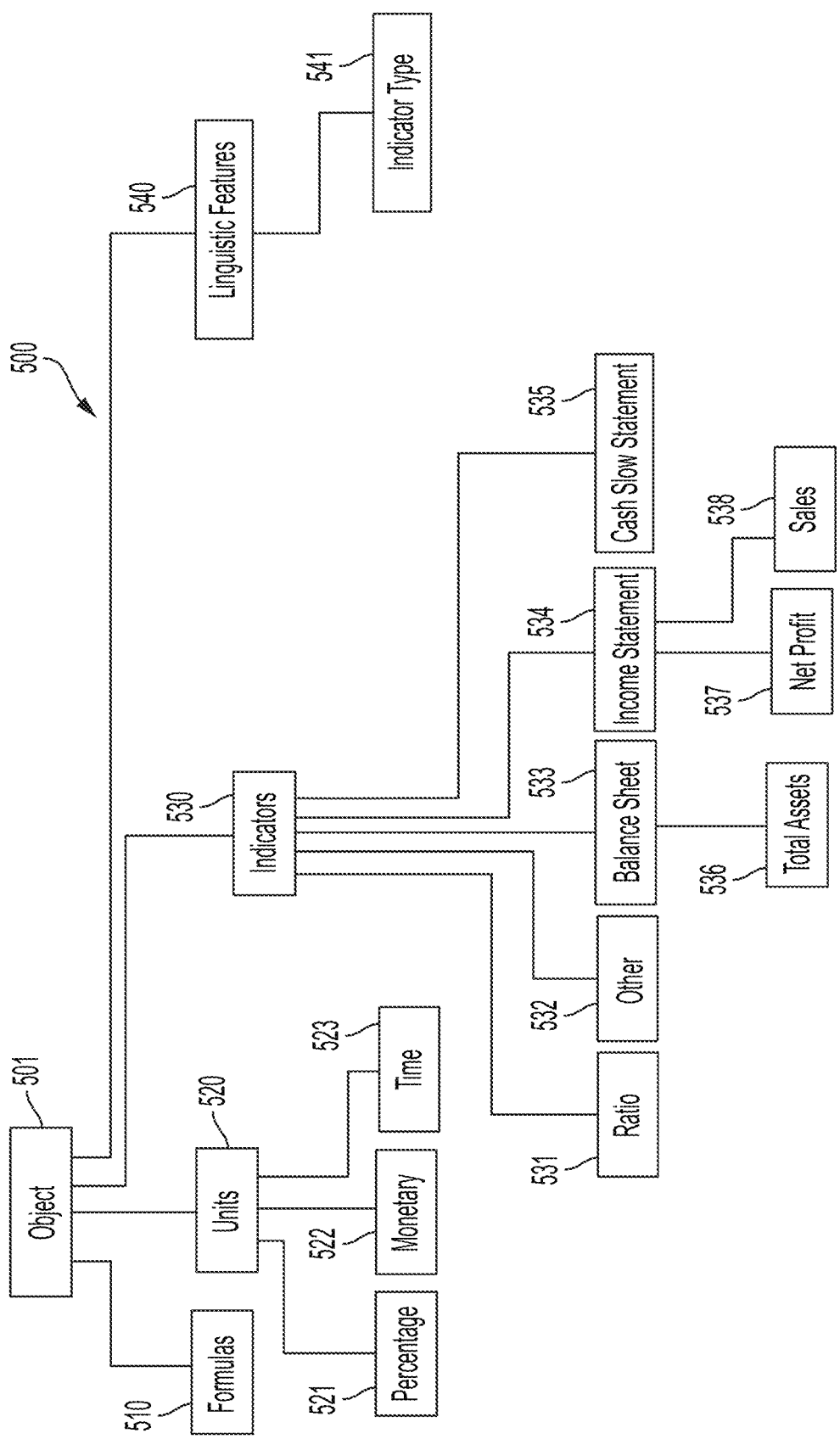
FIG. 5A is an exemplary ontology 500, in accordance with some embodiments of the technology described herein.

FIG. 5A is an exemplary ontology 500, according to some embodiments. The ontology 500 has entities including formulas 510, units 520, indicators 530 and linguistic features 540. These entities may all relate to a base entity, such as the object entity 501.

In some embodiments, the terms of the target vocabulary may be mapped to the entities of the indicators parent entity 530 (referred to herein also as indicators). The terms of the entities of the indicators parent entity 530 to which the terms of the target vocabulary are mapped may be used in generating the NLT and lexicalization. For example, in the example of FIG. 5A, the ontology 500 may be used to generate natural language text such as financial reports. As such, the indicators may include terms that relate to a general financial statement model. For example, indicators 530 includes entities such as ratio 531, other 532, balance sheet 533, income statement 534, and cash flow statement, 535. The entity balance sheet 533 has a child entity total assets 536. The entity income statement 534 has children entities sales 538 and net profit 537.

The children entities of parent entities such as units entity 520, formulas entity 510, and linguistic features entity 540 may comprise auxiliary information used to lexicalize the indicators. The children entities of the indicator entity may be associated with one or more children entities of the units, formulas, and linguistic features parent entities in order to provide more information during lexicalization.

In some embodiments, the units entity 520 includes information relating to types of units corresponding to a measure, such as monetary units (e.g., dollar, curo, etc.), percentage and time units. For example, the units entity includes percentage entity 521, monetary entity 522, and time entity 523. In some embodiments, a child entity of entity indicator may include an additional attribute indicating the type of unit that the entity has. For example, the entity "income statement" may have an attribute (e.g., 'hasUnit' attribute) indicating a type of monetary unit. The entity income statement may then be associated with that monetary unit, such that information stored in the data structure corresponding to the monetary unit under the units entity may be used during lexicalization. In some embodiments, each child entity of the entity may also inherit the attribute indicating the type of unit.

In some embodiments, the ratio entity 531 may be a parent of entities that may have information indicating an associated formula, for example, a formula used to calculate a value of the entity, and may also indicate what entities are used in the formula. For example, the formula information may be stored in the formula entity of entities 510, and the ratio entity 531 may be linked to the formula entity (e.g., through a pointer, by including the ID of the formula entity, etc.). For example, a ratio entity 531 may have attribute, such as 'hasFormula', which may indicate a formula entity.

In the example ontology 500, indicators may be associated or linked to linguistic features 540. For example, linguistic features entities may include indicator type entity 541. Indicator type entities are entities of indicators created according to their semantics and similar linguistic behavior.

In some embodiments, linguistic features 540 may also include a predicate entity. Entities of the predicate entity may correspond to lexical nodes linked to an indicator in a sentence. For example, the lexical nodes may include verbs, adverbs, nouns, etc. that are associated with an indicator and may be used in lexicalization of the indicator.

In some embodiments, entities of the predicate entity can be associated to an indicator through defined attributes. In some embodiments, multiple predicates can be linked to a single indicator if they satisfy the defined attributes (e.g., have a predetermined value for the attributes). For example, an entity of the predicate entity may include the predicate "climb." The entity may have a value for a attribute (e.g., 'positiveContribution' attribute) that indicates that the predicate can be used to express positive gain. Because the entity of the predicate entity has a value of the attribute that indicates positive gain, the entity of the predicate entity may be associated with entities like "earnings" and "profits" which indicate positive gain but not, for example, an entity such as "losses," as losses are associated with negative gain. The entities "earnings" and "profits" may be lexicalized using the predicate "climb.".

As described herein, a predicate of an entity of the predicate entity may be associated to more than one indicator. For example, one or more indicators may be associated with the predicate and used during lexicalization in order to generate, for example, a sentence including a subject and a verb. The entities of the predicate entity may also have linguistic knowledge specific to each instance. For example, the linguistic knowledge may include attributes used in lexicalization, as described herein.

In some embodiments, an entity in the predicate entity may have attributes such as a subject attribute for indicating if the subject of the predicate is a physical entity such as a company or an entity of interest such as an indicator (e.g., an entity corresponding to a financial term). In some embodiments, an entity in the predicate entity may have attributes including an object attribute for indicating the object (object in syntax) of the predicate (e.g., direct, or indirect), a proposition attribute for precising the preposition when the object is indirect.

In some embodiments, the entity may have a determiner attribute that relates to a determiner. A determiner may be a term (e.g., word or phrase) placed before a noun (e.g., an entity) to specify a quantity or to specify what the noun refers to. The determiner may be an article (e.g., "a", "an", and "the"), a demonstrative (e.g., "this", "that", "these", and "those"), a possessive (e.g., "my", "your", "his", "her", "its", "our", and "their"), and/or a quantifier (e.g., "many", "much", "more", "most", "some"). In the case that the entity of interest is a term composed of multiple words, the constituent words of the term may be defined or identified. The constituent words of the term may include words such as determiners and prepositions. The determiner attribute may include information relating to one or more determiners of the term.

In some embodiments, an entity in the predicate entity may have attributes such as a passive form attribute indicating if the predicate associated with the entity is used in passive form, and a reflexive attribute used to indicate if the predicate is reflexive. In some examples, if there is no object, then the attribute is not associated with the predicate entity. In some examples, the subject, object, preposition, and determiner attributes may be of a string type, while the passive form and reflexive attributes may be of Boolean type.

Figure 5B:
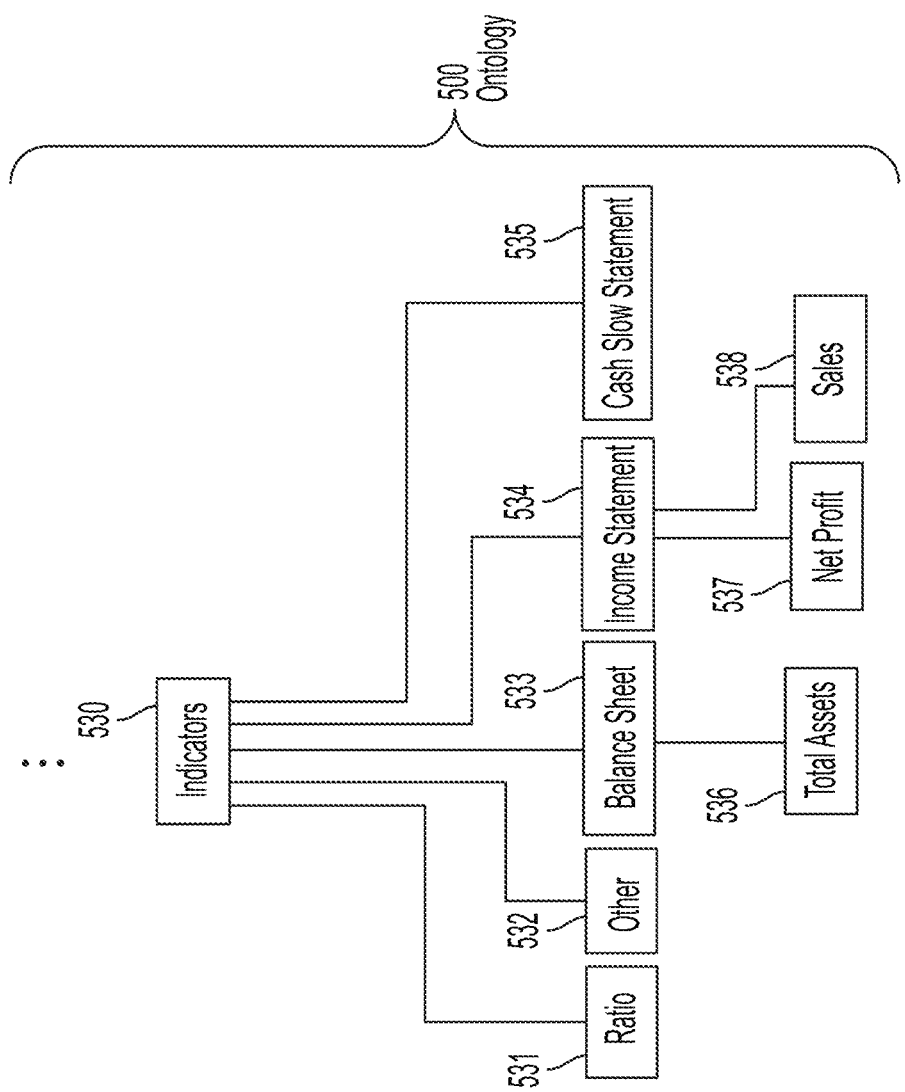
FIG. 5B shows an ontology and target vocabulary prior to modification, in accordance with some embodiments of the technology described herein.
Figure 5C:
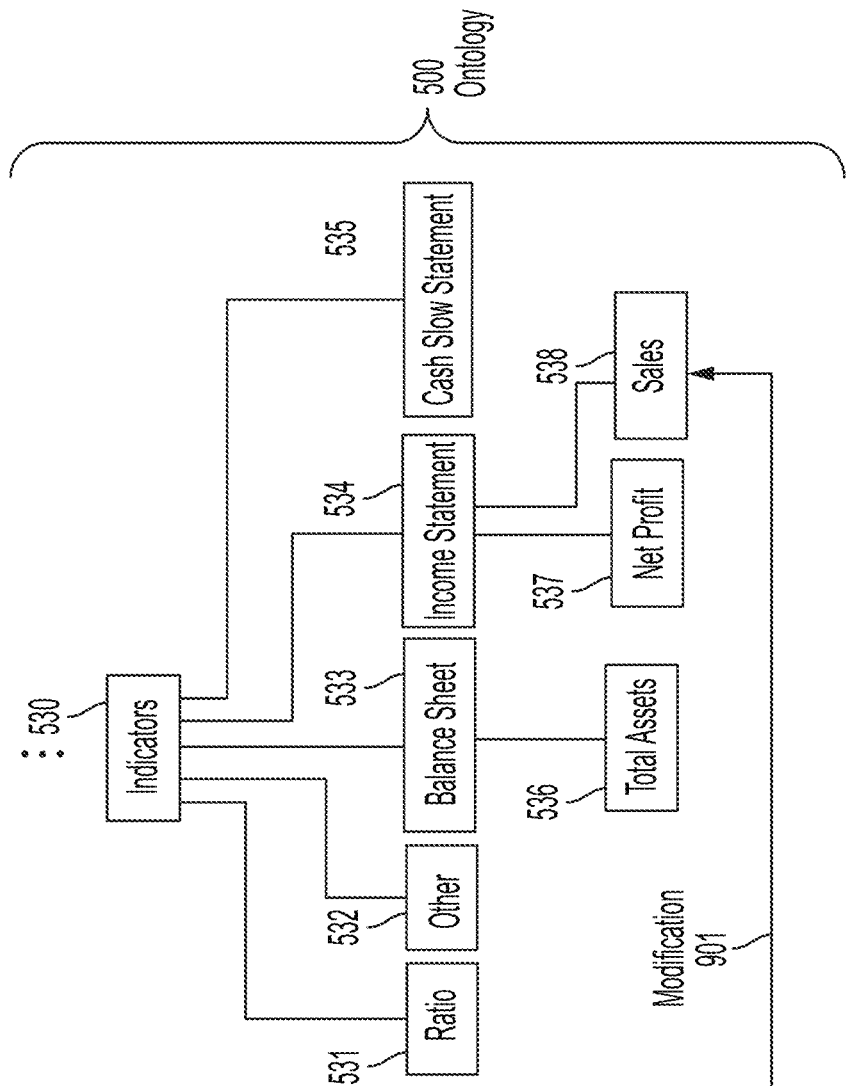
FIG. 5C shows an exemplary modification for adding a term to an existing entity of the ontology, in accordance with some embodiments of the technology described herein.
Figure 5D:
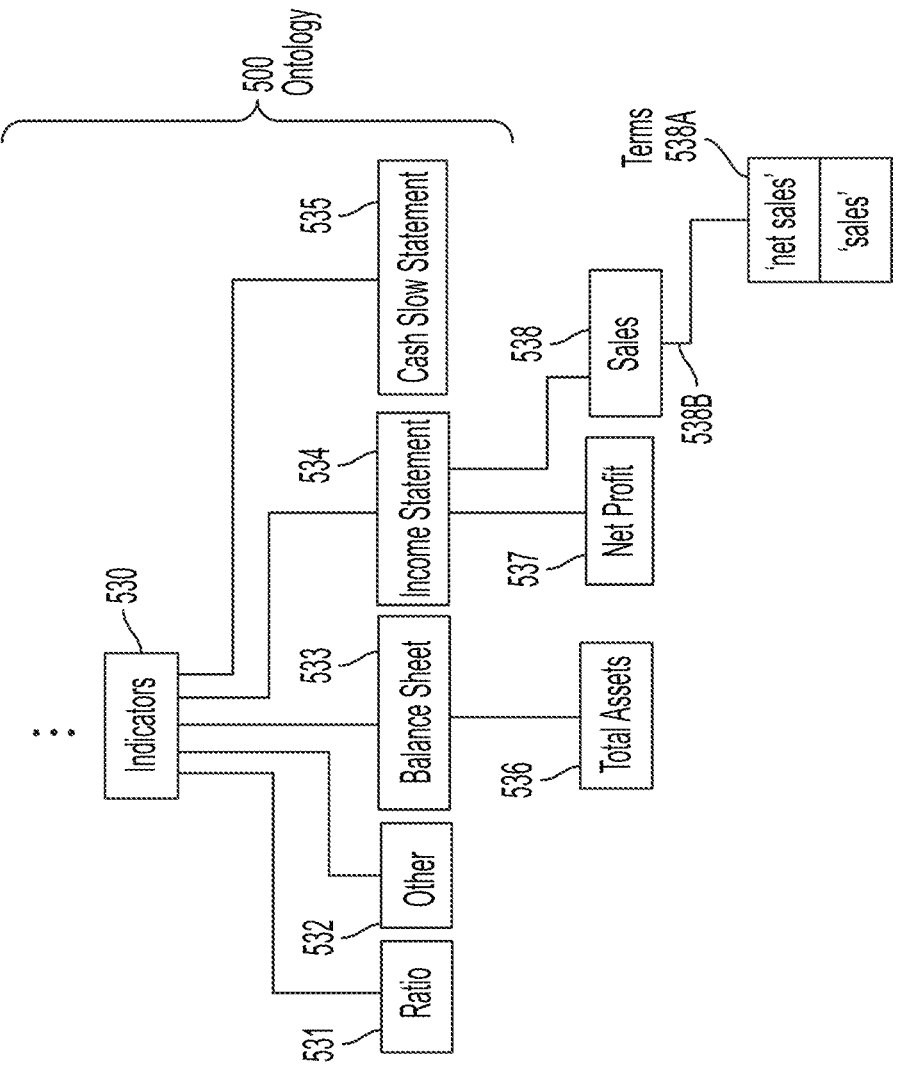
FIG. 5D shows an existing entity with new terms, in accordance with some embodiments of the technology described herein.

As described herein, the ontology 500 may be modified to obtain a modified ontology. For example, the system may modify existing entities of the ontology to include a term of the target vocabulary and/or create new entities for the term of the target vocabulary. For example, FIG. 5B-FIG. 5D shows exemplary modifications of the ontology 500 (e.g., based on user input 140). FIG. 5B shows an ontology and target vocabulary prior to modification. As described herein, the target vocabulary of table 122 includes terms and phrases such as 'Indicator' 122A, 'Units Sold (number)' 122B, 'Manufacturing Price' 122C, 'Sale Price' 122D, 'Gross Sales' 122E, 'Discounts' 122F, 'Net Sales' 122G, 'COGS' 122H, 'Profit' 122I, and 'Sales' 122J.

Figure 5E:
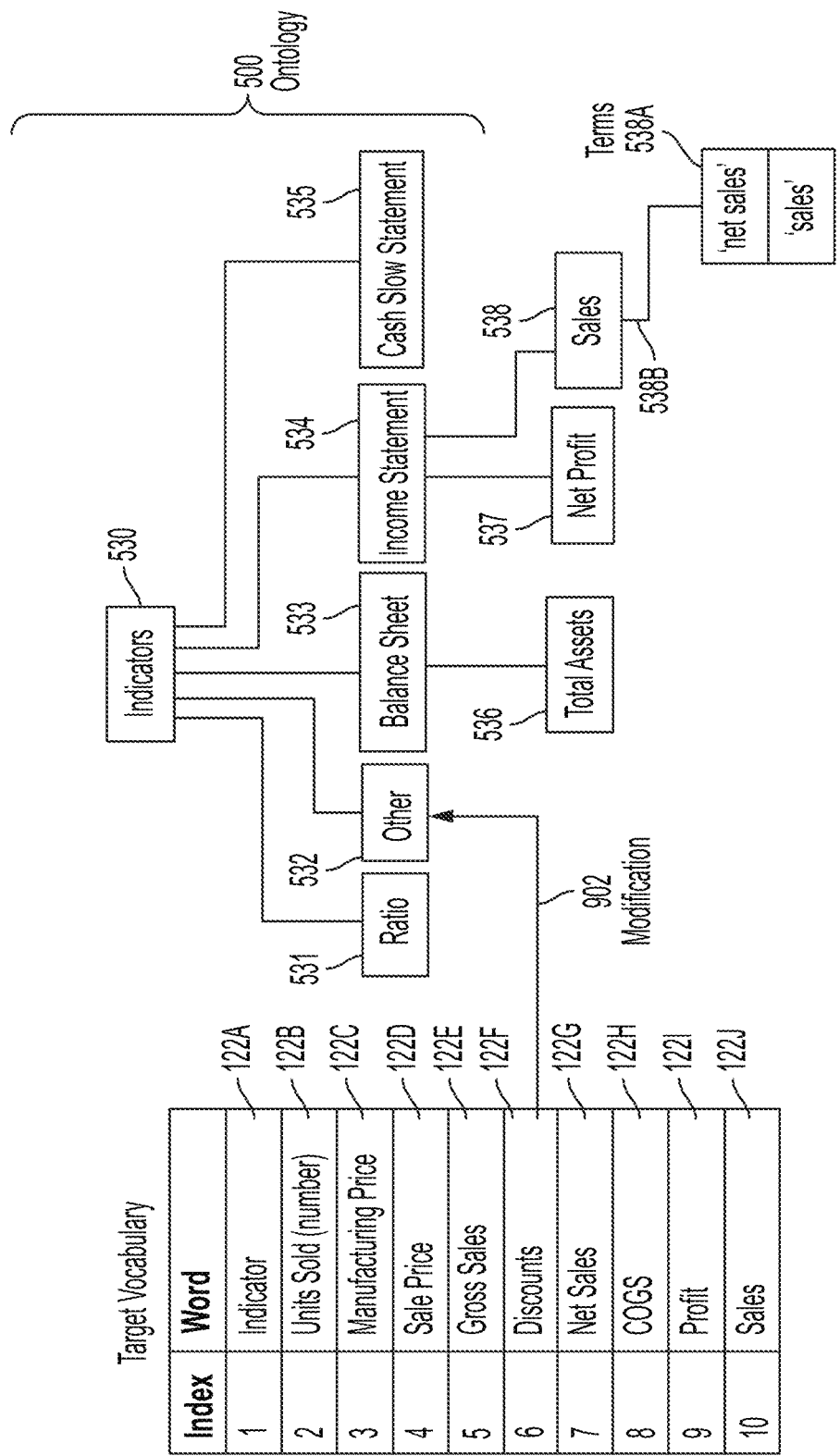
FIG. 5E shows an exemplary modification for adding a new entity to the ontology, in accordance with some embodiments of the technology described herein.

In FIG. 5C, the ontology modification module receives user input 140 indicating a modification 901 to map the term "net sales" 122G of the target vocabulary 122 to the entity of the ontology with the term "Sales" 538. The modification module may map the term to the entity in one or more ways. For example, the entity of the ontology with term "Sales" may be modified to include new terms including the term "sales" from the target vocabulary. In another example, a data structure may be created associating the term to the entity (e.g., example vocabulary mapping file is described herein including with reference to FIG. 10). For example, FIG. 5D shows the entity with term "Sales" 538, with new terms 538A "sales" and "net sales" associated with the entity 538 by association 538B. In FIG. 5E, the ontology modification module may use user input 140 indicating a modification 902 to create a new entity for the term "discounts" 122F. The new entity may be an entity of entity "Other" 532.

Figure 5F:
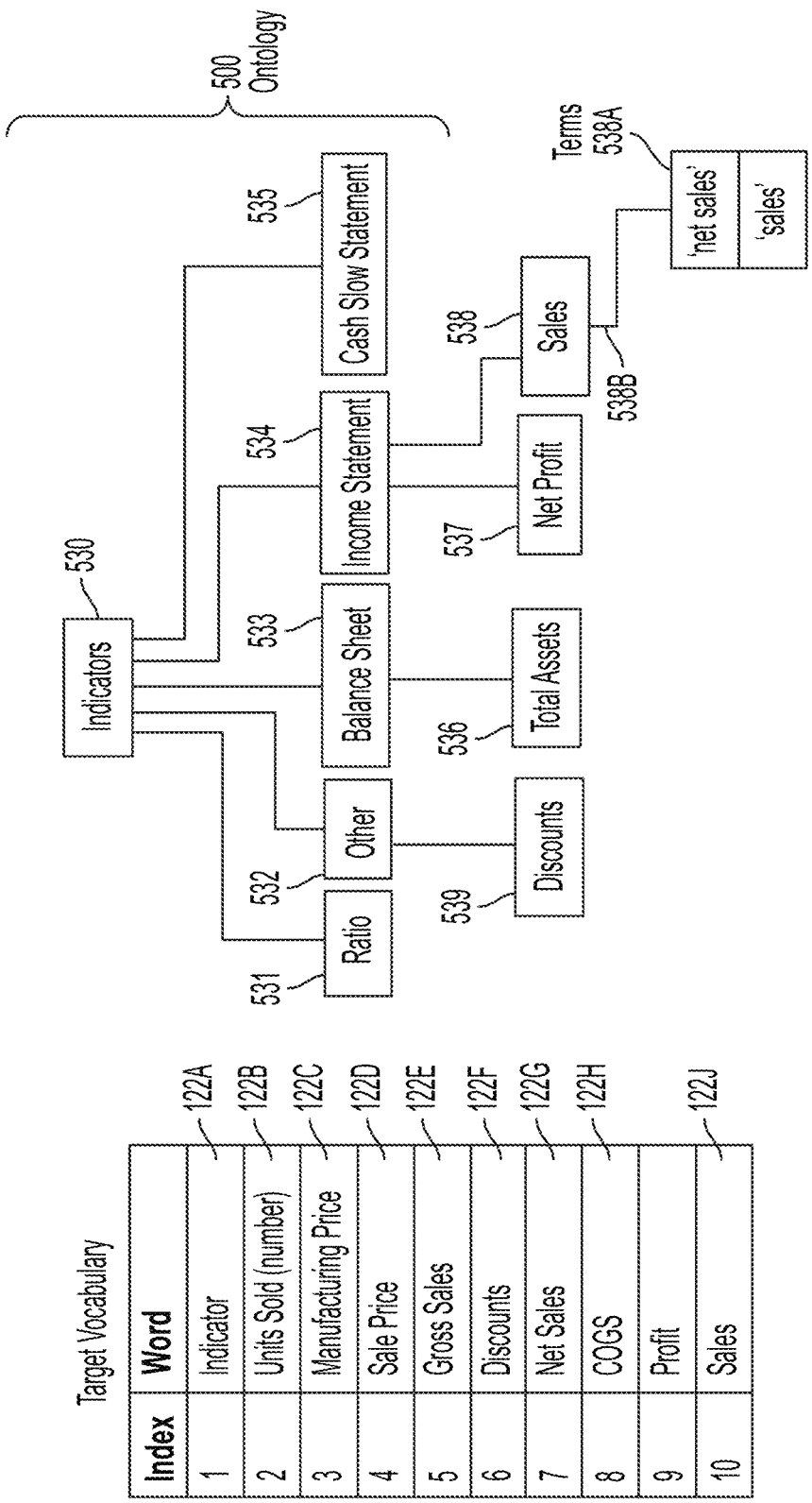
FIG. 5F is an exemplary modified ontology with a new child entity of the entity with term "other," according to some embodiments.

For example, FIG. 5F shows a new entity 539 of terms "discount." In the example of FIG. 5F, the new entity is of the entity "Other."

Figure 6:
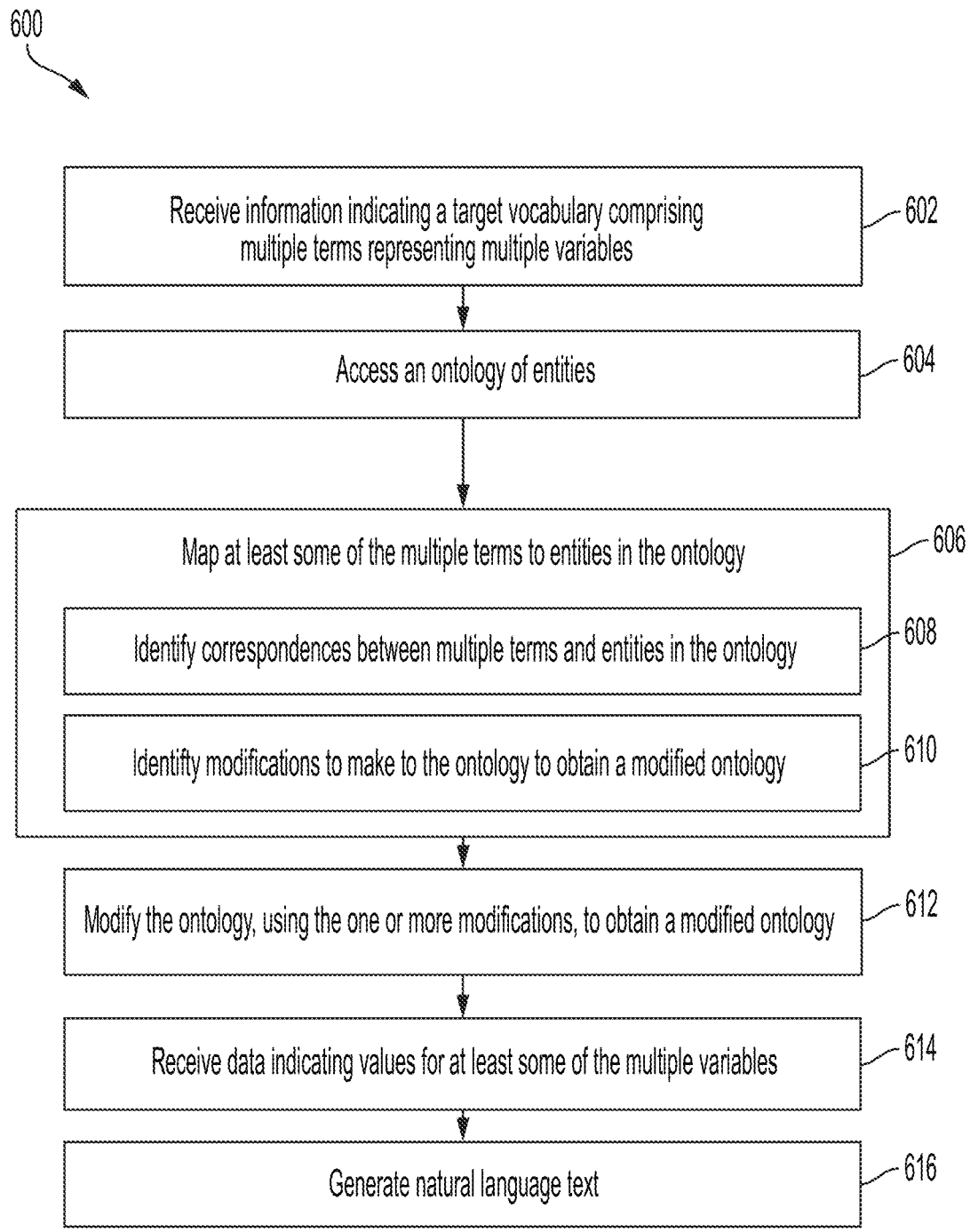
FIG. 6 is a flowchart of an illustrative process for generating natural language text using a customized target vocabulary of the user, in accordance with some embodiments of the technology described herein.

FIG. 6 is a flowchart of an illustrative process 600 for generating natural language text using a customized target vocabulary of the user, according to some embodiments. Process 600 may be performed using any suitable computing device(s). For example, in some embodiments, the system 110 may perform the illustrative process 600 of FIG. 6.

At act 602, the system 110 receives information indicating a target vocabulary comprising multiple terms representing multiple variables. As described herein, a variable may be a quantity, feature, and/or factor that is liable to vary or change. For example, a term "profit" may be a variable representing a value of a profit, while a term "loss" may be a variable representing a value of loss.

In some embodiments, the target vocabulary may be provided to the system (e.g., a user or another system may provide the target vocabulary to the system). For example, the target vocabulary, or a file or data structure including the target vocabulary, may be uploaded to the system 110. In some embodiments, the system may be configured to access the target vocabulary from a database (e.g., from database 180), a file, over a network, and/or any other suitable source. Example target vocabularies are described herein including with reference to FIGS. 3A and 3B At act 604, the computing device(s) performing process 600 (e.g., system 100) may access an ontology of entities. The ontology may be accessed in any suitable way (e.g., over a network, from a local memory) and from any suitable source (e.g., a database, a file, etc.), as aspects of the technology described herein are not limited in this respect. Example ontologies are described herein including with reference to FIG. 4A.

At act 606, the computing devices(s) may map at least some of the multiple terms to entities in the ontology. For example, mapping the terms may include identifying correspondences between multiple terms and entities in the ontology in act 608, and/or identifying modifications to make to the ontology to obtain a modified ontology in act 610. An illustrative process for determining correspondences between multiple terms and entities in the ontology is described herein including with reference to FIG. 7.

At act 612, the computing devices(s) may modify the ontology, using the one or more modifications, to obtain a modified ontology. For example, the system may modify existing entities of the ontology to include a term of the target vocabulary and/or create new entities for the term of the target vocabulary. An exemplary method of modifying an ontology is described herein with reference to FIG. 1B. Exemplary modifications for obtaining a modified ontology are described herein with reference to FIGS. 5B-5F.

At act 614, the computing devices(s) may receive data indicating values for at least some of the multiple variables. For example, system 110 receives data values 171 which includes values associated with certain terms of the target vocabulary (e.g., a "profit" of 100). An illustrative data table with data used in NLT generation is described herein including with reference to FIG. 12. As described herein, the data values may be received by the generation module as a file, and/or a data structure such as a list of values, an array, or a table.

At act 616, the computing devices(s) may generate natural language text (NLT), such as NLT 130. As described herein, the natural language text 130 generated by the system 110 using the target vocabulary may be a phrase, a single sentence, and/or multiple sentences and may be output to one or multiple different destinations (e.g., different devices, one or more users, and/or to a database or data store). The generated text 130 may be used as part of content such as a report, a document, a webpage and/or the like. An exemplary process for generating natural language text is described herein with reference to FIG. 2. Illustrative NLT is described herein including with reference to FIG. 13.

It should be appreciated that the process 600 is illustrative and that there are variations of process 600. For example, in some embodiments, the order of some of the acts in process 600 may be changed. For example, the act 614 of receiving data indicating value(s) for variable(s) may be performed at any point during process 600, as aspects of the technology described herein are not limited in this respect.

FIG. 7 is a flowchart of an illustrative process 700 for determining correspondences between a term of the target vocabulary of the user and the ontology, according to some embodiments. Process 700 may be performed using any suitable computing device(s). For example, system 110 (e.g., using mapping module 150) may perform process 700 to identify information indicative of correspondences 151 the terms of the target vocabulary and one or more respective entities in the ontology and to identify modifications 152 to make to the ontology to obtain the modified ontology 161, as described herein. For example, the mapping module 150 may be configured to determine a similarity between terms belonging to or associated with entities of the ontology and terms of the target vocabulary by calculating one or multiple matching scores.

At act 730, for each candidate term 710 in the target vocabulary, the computing device(s) may calculate a first matching score, such as a matching score based on an edit distance between the candidate term 710 of the target vocabulary and terms 720 of entities of the ontology. In some examples, the edit distance may be a value indicating the minimum number of operations (e.g., deleting a letter, inserting a letter and/or substituting a letter), required to transform one term to the other term. The edit distance may be any suitable edit distance such as Levenshtein distance. Illustrative matching scores are described herein including with reference to FIG. 1B and FIG. 7.

For each of the terms 720, if the first matching score determined at act 730 between the term and the candidate term 710 is higher than a first threshold (e.g., 90), the computing device(s) may determine that the entity with the term corresponds to the candidate term of the target vocabulary. The mapping module may transmit and display the correspondence to the user (e.g., at interface module 145) at act 734.

If the matching scores between the terms 720 of the entities of the ontology and the candidate term 710 for all of the terms 720 do not exceed a second threshold (e.g., below the first threshold, 75), the computing device(s) may identify modifications to make to the ontology to obtain a modified ontology in act 732. For example, the modification may be modifying existing entities to include a term for the candidate term 710, or creating new entities for the candidate term 710. The mapping module may indicate on the interface module 145 candidate terms for modification, for example, by emphasizing a border of an entry corresponding to the candidate term (e.g., a red border, a thicker border).

If one or more matching scores between the terms 720 and the candidate term 710 exceed a second threshold but do not exceed the first threshold, then the computing device(s) may calculate second matching scores between the candidate term 710 and terms 720 in act 736. In some embodiments, the second matching score may be calculated based on a cosine distance between a term of the target vocabulary and a term or sequence of terms of an entity of the ontology. For example, the matching score may be a cosine distance between a first vector representing the term of the target vocabulary and a second vector representing a term of the entity in the ontology.

For each of the terms 720, one or more entities corresponding to one or more terms 720 for which the second matching score was the highest may be determined to correspond to the candidate term of the target vocabulary. The computing device(s) may transmit and display the correspondences to the user (e.g., at interface module 145) at act 738.

FIG. 8A is an example display 800 indicating correspondences between terms of a target vocabulary and entities of an ontology as well as one or more modifications to make to the ontology to obtain a modified ontology to be used for generating natural language text using the target vocabulary. For example, the display shows entries 810, 820, 830, 840, 850, 860, 870, 880, and 890 corresponding to different terms of the target vocabulary.

Entries 810, 820, 830, 840, 850, 860, and 870 correspond to terms of the target vocabulary for which no corresponding entity was found. For example, these entries are entries for which the matching scores between the terms of the entities of the ontology and the term of the target vocabulary do not exceed a second threshold (e.g., 75%). The mapping module may indicate this to the user by displaying the entries associated with the modifications in a first color (e.g., red).

The system 110 may propose a new entity to add to the ontology for each of the terms associated with entries 810, 820, 830, 840, 850, 860, and 870. For example, the entry 810 is associated with the term "units sold (number)" of the target vocabulary. The interface module displays as the ID 811 of the entity of the ontology "CUSTOM", indicating that a new custom entity of the user is suggested. The user can then type the name of an entity they want to create in the ontology into input box 812 and associate it with the appropriate parent entity. This new entity may be inserted in the modified ontology. The user may also specify other attributes of the new entity, such as number and gender.

Entry 880 corresponds to a term for which a matching score between the term of the entry and a term of an entity of the ontology exceeds a second threshold (e.g., 75%) but does not exceed the first threshold (e.g., 90%). The mapping module map indicate such entries by displaying the entries associated with the modifications in a second color (e.g., yellow). Entry 890 corresponds to a term for which a matching score between the term of the entry and a term of an entity of the ontology exceeds a first threshold (e.g., 95%). The mapping module map indicate such entries by displaying the entries associated with the modifications in a third color (e.g., green). For terms associated with entries 880 and 890, a corresponding entity of the ontology was found and displayed to the user. In FIG. 8B, the user selects the new entry ID (e.g., which may be pre-populated, and/or entered by the user) from the dropdown list 813.

In FIG. 8C, the user maps a term of the target vocabulary "COGS" to the existing entity Cost of Sales. For example, the user changes the entity ID from CUSTOM to EXISTING by selecting EXISTING in the drop down list 871. In response, a second drop down list 872, as shown in FIG. 8D, may appear with a list of entity IDs. The user may then select the ID of the desired entity, in this example, COST_OF_SALES.

In some embodiments, when a user creates a new entity, the user can also specify which entity the entity belongs to.

For example, in FIG. 8E, the user can select from one or more parent entities of the entity identified by ID on the drop down list 841. When the ontology modification module modifies the ontology, the created entity may be an entity of the selected parent entity "RESULTS".

In the example of FIG. 8F, the user changes a mapping between the term "profits" of the target vocabulary and the entity with ID NET_EARNINGS to a mapping to the entity with ID GROSS_PROFIT. For example, the user can select from one or more parent entities of the entity identified by ID on the drop down list 882.

As described herein, the system 110 may be configured to automatically check when two or more terms of the target vocabulary mapped and/or determined to correspond to a same entity of the ontology. In response to determining that two or more are mapped to the same entity, the system may indicate an error that the entity is mapped twice. For example, the system may highlight, on the display, the entries corresponding to the terms of the target vocabulary that map to a same ontology entity. In FIG. 8G, entry 860 corresponding to the term "net sales" and entry 890 corresponding to the term "sale" both map to the entity with ontology ID "SALES." As a result, the system 110 emphasizes the border around the entries 860 and 890.

The user may then select to ignore the lexicalization for entry 890, as in FIG. 8H. For example, the user may select an option IGNORE from dropdown list 892. Subsequently, FIG. 8I shows that the error is gone and the entries corresponding to the terms of the target vocabulary that map to a same ontology entity are no longer emphasized.

FIG. 8I shows the display 800 with all user input indicating modifications to be made to the ontology. The user may choose to export the mapping information, for example, by selecting the "Export Mapping" button 801. Example exported mapping information is described herein including with reference to FIGS. 9-11. For example, the mapping information may be exported as data stored in data structures such as tables, arrays, lists, or as data stored in files, such as files 910 and 920 described below. Once the user has completed inputting the user input, the ontology modification module may make modifications based on the correspondences, the modifications, and the user input. The modified ontology may then be used to generate NLT.

As described herein, the user may export files, or any suitable data structure, that may include data on the modified ontology 161. For example, FIG. 9 shows examples of user exported files, including a vocabulary extension file 910 and vocabulary mapping file 920. The vocabulary mapping file 920 may include data indicating correspondences between the terms of the target vocabulary and the entities of the ontology, as described herein. The vocabulary extension file 910 may further include linguistic attributes or information which can be used during natural language generation and lexicalization.

For example, FIG. 10 is an example of a vocabulary mapping file 920, according to some embodiments. The vocabulary mapping file may indicate an ID for an entity of the ontology for which a term of the target vocabulary is mapped as well as a confidence level of the mapping. The terms may be indexed with indices 1050, for example, to use in referencing the terms of the target vocabulary. Each term may have entries for correction 1040, confidence 1030, ID 1020, and term 1010.

A term "gross sales" 1011 may have a correction entry 1041 "CREATE," which can indicate that the user created a new entity for the ontology, for example, in the case where a suitable entity could not be found in the ontology (e.g., low matching scores or low confidence level 1031). The system may generate a new entity ID for the new entity, such as ID GROSS_SALES 1021 for mapping the term to.

A term "discounts" 1012 may have been mapped to the entity with ID DISCOUNTS 1022 with a confidence level 1032 of low. The correction entry 1042 has no entry, which can indicate that the user did not modify the mapping, for example, by creating a new entity or choosing an entity from the ontology.

A term "net sales" 1013 has correction entry 1043 "CHANGE", which can indicate that the user modified the mapping from a previous mapping, for example, by choosing a different entity, SALES 1023, from the ontology. The user may have been prompted to do so based on the low confidence level 1033.

A term "profit" 1014 may have been mapped to the entity with ID GROSS_PROFIT 1024 with a confidence level 1034 of medium. The correction entry 1044 "CHOOSE" can indicate that the user chose the entity from a list of entities of the ontology and/or terms associated with entities of the ontology.

FIG. 11 is an example of a vocabulary extension file 910, according to some embodiments. As described herein, the vocabulary extension file 1100 may include further attributes of the terms of the target vocabulary determined based on the attributes of the entities they have been mapped to or based on data from the user in the user input 140. For example, the attributes may be information which can be used during natural language generation and lexicalization.

For each term, the vocabulary extension file may include information in attributes such as operation 1110, id (e.g., identification) 1120, parent 1130, neg 1140, type 1150, lang (e.g., language) 1160, term 1170, number 1180, and gender 1190. Each row may be associated with a term of the target vocabulary. For example, the indices 1101 may correspond to the indices 1050 of file 920 (e.g., the row of index 0 corresponds to the term "units sold (number)").

The operation attribute 1110 may indicate the modification to the ontology. Values of the operation attribute 1110 may include "new", "add", "del", "mod" and "reparent." A value of "new" may indicate that a new entity is created, together with its attributes (terms, etc.). A value of "add" may indicate that a new term is added to an existing entity. A value of "del" may indicate deletion of a term from an existing entity, or deletion of another attribute of the entity. A value of "mod" may indicate a change of an entity term attribute. In some examples, other terms of the entity may be discarded, and only the new one(s) may be used. A value of "reparent" indicates moving the entity in the ontology.

The id attribute 1120 is an identifier of the entity associated with the term of the target vocabulary of the same index. In some embodiments, the identifier may always be written as a combination of capital letters and "_" characters.

The parent attribute 1130 may be an identifier of the parent entity of the entity to which the term of the target vocabulary is mapped. In some embodiments, the parent entity's identifier must be an existing name in the ontology or a newly-created name in the extension file.

The neg attribute 1140 indicates a negative contribution of the term to its parent if set to non-blank.

The type attribute 1150 may indicate the type of parent entity the entity belongs to. For example, in the finance domain, the type may be ASSETS, EXPENSES, TAXES, etc.

The language attribute 1160 may indicate the language of the data. In some embodiments, the language attribute is written as a 2-letter code ("en", "fr", etc.).

The terms attribute 1170 may indicate one or more terms used to express the concept in natural language. In some examples where there is more than one term, a preferred term may also be indicated. The preferred term may be used to represent the entity when lexicalized and may be used in combination with other information of the entity during natural language generation. For example, the preferred term may correspond to a lexicalization in a specified language and domain of use.

The number attribute 1180 may be a grammatical attribute of the entity and can be either "singular" indicating that the entity is a singular entity or "plural" indicating that the entity is a plural entity.

The gender attribute 1190 may be a grammatical attribute of the entity and can be "masculine", "feminine", "neutral", and/or the like when applicable. For example, this may be applicable to languages that have gendered words, for example, the gender attribute may be left empty and/or ignored when the language is set to English for example.

In some embodiments, the attributes may also include a flag (e.g., "UseIfNeg"). The attribute may be a flag that is activated to alert the NLG system when the "Neg" attribute is used, as described above.

FIG. 12 is an example data table 1200 mapped from a user's model source data. The example data table 1200 includes indicators 1210 such as "profit" 1211, and corresponding values such as the values 1220 of the indicators 1210 in year 2020, and the values 1230 of the indicators 1210 in the year 2019. For example, profit 1211 had a value 1221 of 3,132,025 in 2020, and a value 1231 of 3,522,296 in 2019.

As described herein, the natural language text generation module may use the terms of the target vocabulary to produce text, the natural language text generation module may also take in data such as data table 1200 of FIG. 12 to generate natural language text. FIG. 13 is an example of text 1300 generated using terms from the target vocabulary. For example, as in the above examples, the target vocabulary term "profit" was mapped to the ontology entity with term 1301 "gross profit." In the text 1300, the information from the entity with term "gross profit" is used to lexicalize the information provided by the data table 1200.

Figure 14A:
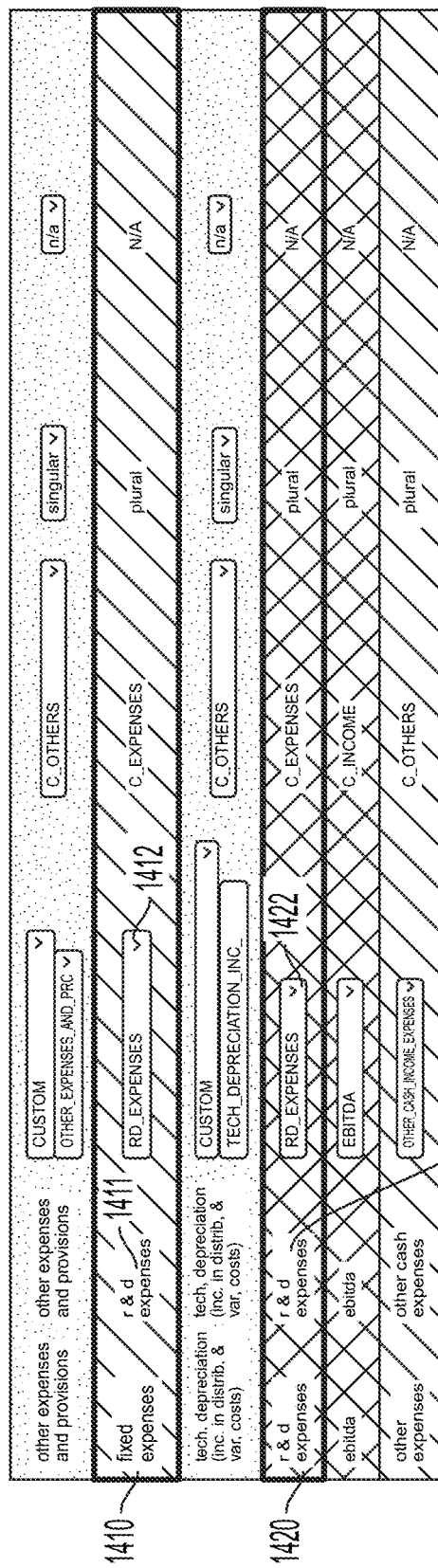
FIG. 14A is an example of a display indicating entries corresponding to two terms of a target vocabulary that are mapped to a same ontology entity, in accordance with some embodiments of the technology described herein.

In some embodiments, the system 110 may be configured to determine and indicate when an entity of the ontology is mapped to two or more terms of the target vocabulary. For example, referring back to FIG. 1B, at the ontology modification module 160, in response to receiving the correspondences and modifications, the system may be configured to automatically check for two or more terms of the target vocabulary mapped and/or determined to correspond to a same entity of the ontology. In response, the system may indicate that the entity is mapped twice. For example, the system may highlight, on the display, the entries corresponding to the terms of the target vocabulary that map to a same ontology entity. For example, in FIG. 14A, entries 1410 and 1420 correspond to two different terms of the target vocabulary. For example, entry 1410 corresponds to the term "fixed expenses" 1411 with ID 1412 "RD_EXPENSES" and entry 1420 corresponds to the term "r & d expenses" 1421 with ID 1422 "RD_EXPENSES". Both terms of the target vocabulary are indicated to correspond to the ontology entity with identification (ID) RD_EXPENSES. As a result, both entries are highlighted with an emphasized border around the entries.

Figure 14B:
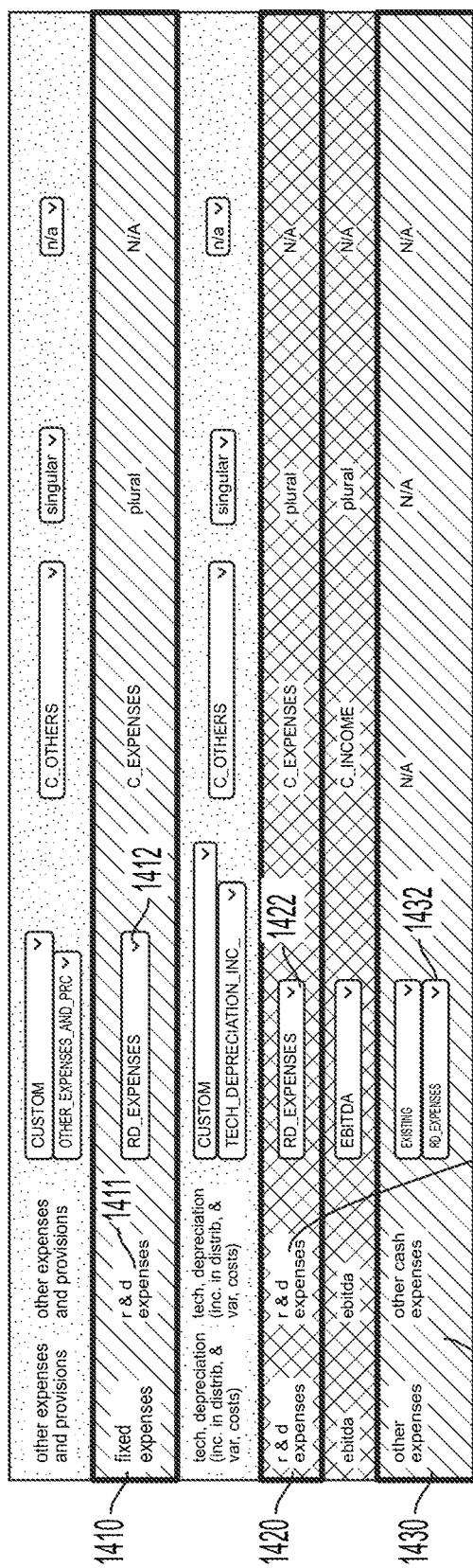
FIG. 14B is an example of a display indicating entries corresponding to three terms of a target vocabulary that are mapped to a same ontology entity, in accordance with some embodiments of the technology described herein.
Figure 14C:
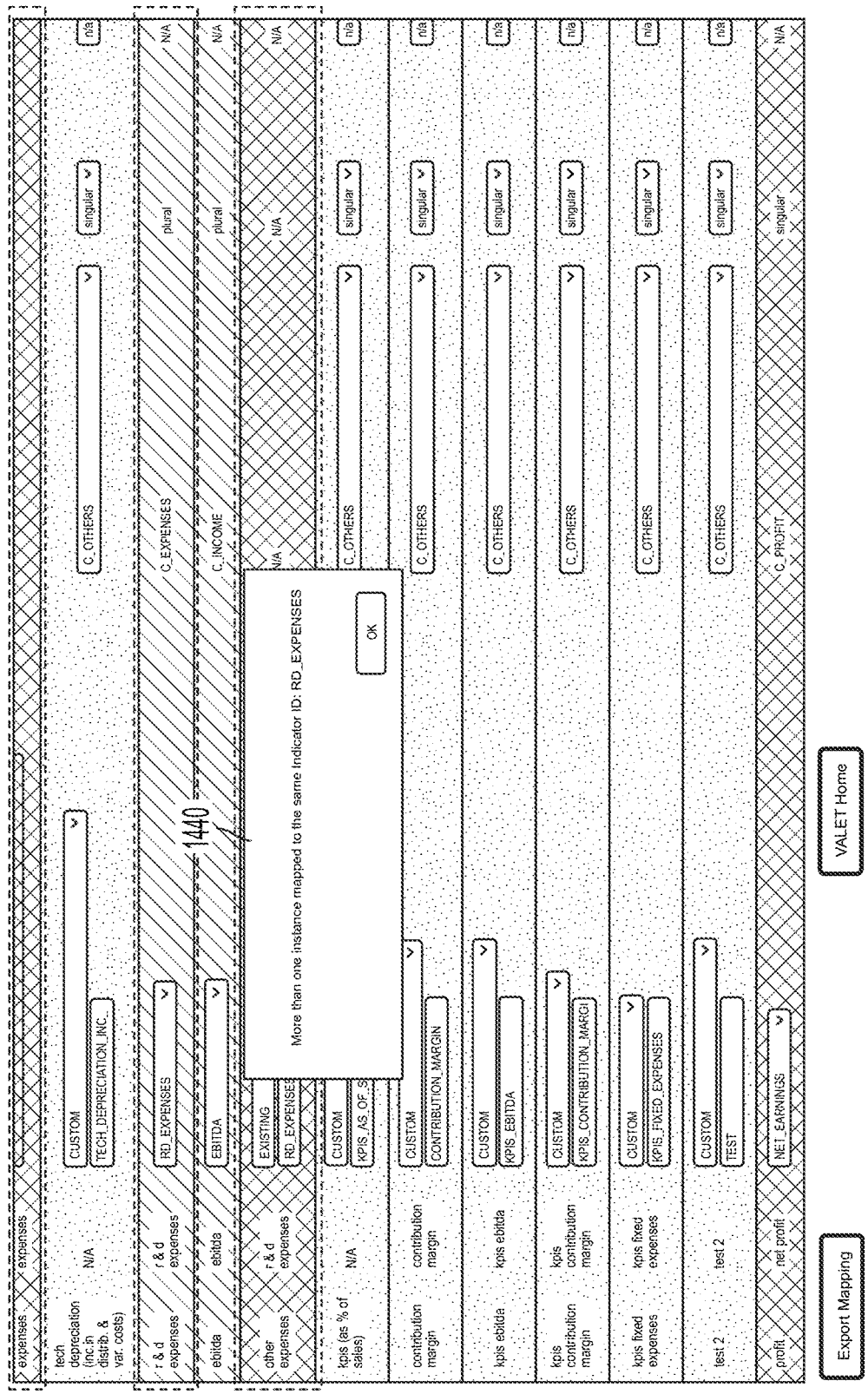
FIG. 14C is an example of an error message in response to a request to export, in accordance with some embodiments of the technology described herein.

Referring to FIG. 1C, the system may be configured to automatically check for two or more terms of the target vocabulary mapped and/or determined to correspond to a same entity of the ontology in response to receiving user input 140, for example, whenever a user provides an input. For example, in FIG. 14B, as in FIG. 14A, entries 1410 and 1420 corresponding to the terms "fixed expenses" 1411 and "r & d expenses" are both indicated to correspond to the ontology entity with identification (ID) RD_EXPENSES. In this example, the user has provided user input to update the mapping of entry 1430 corresponding to the target vocabulary term "other expenses" 1431 to map to the ontology entity with ID RD_EXPENSES 1432 as well. As a result, all three entries 1410, 1420, 1430 are highlighted with an emphasized border around the entries.

Additionally or alternatively, when a user input confirms the mapping, or if a user chooses to export the mapping, the system may automatically perform the check. After performing the check, the system may prevent the mapping from being used and/or exported in response to determining two or more terms of the target vocabulary correspond to a same entity of the ontology. In some examples, the system 110 may be configured to display an error message. For example, in response to an attempt to export the mapping, the system may display (e.g., on the interface module) error message 1440 indicating the ontology entity that is being mapped more than once.

Additional Implementation Detail

Figure 15:
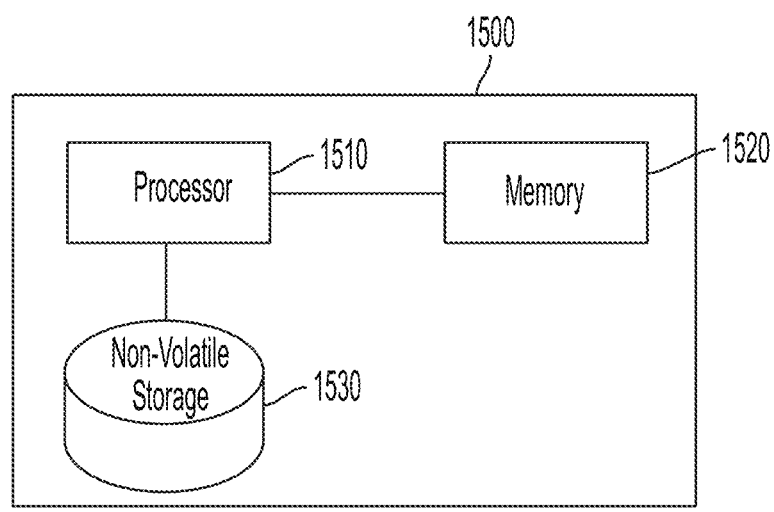
FIG. 15 is a block diagram of an illustrative computer system that may be used in implementing some embodiments of the technology described herein.

An illustrative implementation of a computer system 1500 that may be used in connection with any of the embodiments of the disclosure provided herein is shown in FIG. 15. The computer system 1500 may include one or more processors 1510 and one or more articles of manufacture that comprise non-transitory computer-readable storage media (e.g., memory 1520 and one or more non-volatile storage media 1530). The processor(s) 1510 may control writing data to and reading data from the memory 1520 and the non-volatile storage device 1530 in any suitable manner, as the aspects of the technology described herein are not limited in this respect. To perform any of the functionality described herein, the processor(s) 1510 may execute one or more processor-executable instructions stored in one or more non-transitory computer-readable storage media (e.g., the memory 1520), which may serve as non-transitory computer-readable storage media storing processor-executable instructions for execution by the processor(s) 1510.

The terms "program" or "software" are used herein in a generic sense to refer to any type of computer code or set of processor-executable instructions that can be employed to program a computer or other processor to implement various aspects of embodiments as described herein. Additionally, in some embodiments, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have attributes that are related through location in the data structure. Such relationships may likewise be achieved by assigning storage for the attributes with locations in a non-transitory computer-readable medium that convey relationship between the attributes. However, any suitable mechanism may be used to establish relationships among information in attributes of a data structure, including through the use of pointers, tags or other mechanisms that establish relationships among data elements.

Also, various inventive concepts may be embodied as one or more processes, of which examples have been provided including with reference to FIGS. 4A and 6. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as terms to distinguish one claim element having a certain name from another element having a same name (but for use of the ordinal term).

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "substantially", "approximately", and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method of generating natural language text, the method comprising:
    using at least one computer hardware processor to perform:
        receiving information indicating a target vocabulary for use in generating natural language text, the target vocabulary comprising multiple terms representing multiple respective variables;
        accessing an ontology of entities used for generating natural language text, wherein each of at least some of the entities in the ontology of entities is associated with one or more respective linguistic attributes;
        mapping at least some of the multiple terms to entities in the ontology, the mapping comprising:
            identifying information indicative of correspondences between one or more of the at least some of the multiple terms and one or more respective entities in the ontology; and
            identifying one or more modifications to make to the ontology to obtain a modified ontology to be used for generating natural language text using the target vocabulary;
        modifying the ontology, using the one or more modifications and correspondences, to obtain a modified ontology;
        receiving data indicating values for at least some of the multiple variables; and
        generating natural language text using the data and information in the modified ontology associated with the at least some of the multiple variables.

2. The method of claim 1, wherein identifying information indicative of correspondences comprises:
    calculating a first matching score between each of the one or more terms and one or more entities in the ontology; and
    identifying, for each of the one or more terms, one or more entities in the ontology for which the first matching score exceeds a first threshold.

3. The method of claim 2, wherein the first matching score is determined using an edit distance between a term of the one or more terms and one or more entities in the ontology.

4. The method of claim 2, wherein identifying information indicative of correspondences comprises identifying that there are no correspondences between one or more of the at least some of the multiple terms and one or more respective entities in the ontology.

5. The method of claim 1, wherein identifying information indicative of correspondences comprises:
    calculating a first matching score between each of the one or more terms and one or more entities in the ontology;
    in response to determining that there is no entity in the ontology for which the first matching score exceeds a first threshold;
    identifying, for each of the one or more terms, one or more entities in the ontology for which the first matching score exceeds a second threshold;
    calculating a second matching between each of the one or more terms and one or more entities in the ontology; and
    identifying, for each of the one or more terms, one or more entities in the ontology having a highest second matching score.

6. The method of claim 5, wherein the second matching score is determined using a cosine distance between a term of the one or more terms and one or more entities in the ontology.

7. The method of claim 5, wherein the second matching score is determined using a cosine distance of a first vector representing a term of the one or more terms and a second vector representing one or more entities in the ontology.

8. The method of claim 5, wherein the one or more modifications comprises adding one or more new entities to the ontology based on one or more terms of the multiple terms for which there is no entity in the ontology for which the first matching score exceeds the second threshold.

9. The method of claim 8, wherein the correspondences are displayed in a first color and the one or more modifications are displayed in a second color.

10. The method of claim 5, wherein the one or more modifications comprises modifying one or more entities of the ontology based on one or more terms of the multiple terms for which there is no entity in the ontology for which the first matching score exceeds the second threshold.

11. The method of claim 5, wherein identifying one or more modifications comprises: identifying one or more terms of the multiple terms for which there is no entity in the ontology for which the first matching score exceeds the second threshold.

12. The method of claim 1, further comprising displaying, using a graphical interface, the correspondences and the one or more modifications to a user.

13. The method of claim 1, wherein modifying the ontology comprises:
    displaying, to a user, the identified one or more modifications;
    receiving, from the user, information comprising one or more correspondences between one or more of the at least some of the multiple terms and one or more respective entities in the ontology; and
    adding and/or modifying one or more entities in the ontology based on the information.

14. The method of claim 1, wherein modifying the ontology, using the one or more modifications and correspondences, comprises associating a term of the multiple terms to an entity in the ontology.

15. The method of claim 1, further comprising indicating, to a user, when an entity of the ontology is mapped to two or more terms of the target vocabulary.

16. The method of claim 1, wherein linguistic attributes comprise one or more of gender and/or number.

17. A system, comprising:
  at least one processor configured to perform:
    receiving information indicating a target vocabulary for use in generating natural language text, the target vocabulary comprising multiple terms representing respective multiple variables;
    accessing an ontology of entities used for generating natural language text, wherein each of at least some of the entities in the ontology of entities is associated with one or more respective linguistic attributes;
    mapping at least some of the multiple terms to entities in the ontology, the mapping comprising:
      identifying information indicative of correspondences between one or more of the at least some of the multiple terms and one or more respective entities in the ontology; and
      identifying one or more modifications to make to the ontology to obtain a modified ontology to be used for generating natural language text using the target vocabulary;
    modifying the ontology, using the one or more modifications, to obtain a modified ontology;
    receiving data indicating values for at least some of the multiple variables; and
    generating natural language text using the data and information in the modified ontology associated with the at least some of the multiple variables.

18. At least one non-transitory computer readable storage medium storing processor-executable instructions that, when executed by at least one processor, cause the at least one processor to perform a method for generating natural language text, the method comprising:
  receiving information indicating a target vocabulary for use in generating natural language text, the target vocabulary comprising multiple terms representing respective multiple variables;
  accessing an ontology of entities used for generating natural language text, wherein each of at least some of the entities in the ontology of entities is associated with one or more respective linguistic attributes;
  mapping at least some of the multiple terms to entities in the ontology, the mapping comprising:
    identifying information indicative of correspondences between one or more of the at least some of the multiple terms and one or more respective entities in the ontology; and
    identifying one or more modifications to make to the ontology to obtain a modified ontology to be used for generating natural language text using the target vocabulary;
  modifying the ontology, using the one or more modifications, to obtain a modified ontology; receiving data indicating values for at least some of the multiple variables; and
  generating natural language text using the data and information in the modified ontology associated with the at least some of the multiple variables.

* * * * *

UNITED STATES PATENT AND TRADEMARK OFFICE
CERTIFICATE OF CORRECTION

| | |
|---|---|
| PATENT NO. | : 12,106,049 B1 |
| APPLICATION NO. | : 17/695920 |
| DATED | : October 1, 2024 |
| INVENTOR(S) | : Hanna Abi-Akl et al. |

It is certified that error appears in the above-identified patent and that said Letters Patent is hereby corrected as shown below:

On the Title Page

Item (71):
"Applicant: YSEOP SA, Lyons (FR)"
Should read:
--Applicant: YSEOP SA, Lyon (FR)--

Item (73):
"Assignee: YSEOP SA, Lyons (FR)"
Should read:
--Assignee: YSEOP SA, Lyon (FR)--

Signed and Sealed this
Twenty-fourth Day of December, 2024

Derrick Brent
*Acting Director of the United States Patent and Trademark Office*